(12) United States Patent
Liu et al.

(10) Patent No.: US 11,671,715 B2
(45) Date of Patent: Jun. 6, 2023

(54) HIGH DYNAMIC RANGE TECHNIQUE SELECTION FOR IMAGE PROCESSING

(71) Applicant: QUALCOMM Incorporated, San Diego, CA (US)

(72) Inventors: Tai-Hsin Liu, Taipei (TW); Wen-Chun Feng, New Taipei (TW); Wei-Chih Liu, Taipei (TW); Jun-Zuo Liu, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/149,371

(22) Filed: Jan. 14, 2021

(65) Prior Publication Data
US 2022/0224820 A1  Jul. 14, 2022

(51) Int. Cl.
*H04N 23/741* (2023.01)
*H04N 23/68* (2023.01)
*H04N 23/45* (2023.01)

(52) U.S. Cl.
CPC ....... *H04N 23/741* (2023.01); *H04N 23/6811* (2023.01); *H04N 23/45* (2023.01)

(58) Field of Classification Search
None
See application file for complete search history.

(56) References Cited

U.S. PATENT DOCUMENTS

| 5,880,777 | A | * | 3/1999 | Savoye | H04N 5/335 |
| | | | | | 348/217.1 |
| 2008/0001881 | A1 | * | 1/2008 | Baba | G09G 3/3406 |
| | | | | | 345/89 |
| 2012/0081579 | A1 | * | 4/2012 | Doepke | H04N 9/68 |
| | | | | | 348/222.1 |
| 2013/0028509 | A1 | | 1/2013 | Moon et al. | |
| 2015/0062382 | A1 | | 3/2015 | Cote et al. | |
| 2015/0201118 | A1 | | 7/2015 | Lee et al. | |

(Continued)

FOREIGN PATENT DOCUMENTS

| KR | 20190018280 A | 2/2019 | |
| WO | WO-2013127338 A1 * | 9/2013 | ......... H04N 5/35572 |

(Continued)

OTHER PUBLICATIONS

Partial International Search Report—PCT/US2021/063794—ISA/EPO—dated Apr. 26, 2022, 18 pp.

(Continued)

*Primary Examiner* — Quan Pham
(74) *Attorney, Agent, or Firm* — Qualcomm Incorporated

(57) ABSTRACT

A device for camera processing is configured to receive a preview image, and determine if the preview image is a high dynamic range (HDR) scene based on brightness values of pixels of the preview image. The device may further determine to use a single frame image capture technique based on a determination that the preview image is not an HDR scene, and determine to use one of a plurality of HDR image capture techniques based on a determination that the preview image is an HDR scene, and further based on motion detected in the preview image. The device may then generate an output image using one or more images captured using the single frame image capture technique or one of the plurality of HDR image capture techniques.

24 Claims, 10 Drawing Sheets

(56) References Cited

U.S. PATENT DOCUMENTS

| | | | |
|---|---|---|---|
| 2015/0271405 A1 | 9/2015 | Lameer et al. | |
| 2019/0230273 A1 | 7/2019 | Min et al. | |
| 2020/0007733 A1* | 1/2020 | Shimizu | H04N 5/2327 |
| 2021/0360157 A1* | 11/2021 | Veit | H04N 5/23251 |
| 2022/0146617 A1* | 5/2022 | Nakagawa | G01S 3/7864 |

FOREIGN PATENT DOCUMENTS

| | | | | |
|---|---|---|---|---|
| WO | 2019183813 A1 | 10/2019 | | |
| WO | WO-2019183813 A1 * | 10/2019 | | H04N 5/232 |
| WO | WO-2020060598 A1 * | 3/2020 | | H04N 5/2351 |

OTHER PUBLICATIONS

International Search Report and Written Opinion—PCT/US2021/063794—ISA/EPO—dated Jun. 22, 2022, 25 pp.

* cited by examiner

HIGH DYNAMIC RANGE TECHNIQUE SELECTION FOR IMAGE PROCESSING

TECHNICAL FIELD

The disclosure relates to image capture and processing.

BACKGROUND

Image capture devices are incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets, such as mobile telephones having one or more cameras, cellular or satellite radio telephones, camera-equipped personal digital assistants (PDAs), panels or tablets, gaming devices, computer devices that include cameras, such as so-called "web-cams," or any devices with digital imaging or video capabilities.

Images captured by digital cameras are most commonly Low Dynamic Range (LDR) images (sometimes referred to as Standard Dynamic Range or SDR). Images captured in LDR/SDR may, in some lighting situations, include a loss of detail in bright or dark areas of a picture depending on the exposure settings of a camera. A High Dynamic Range (HDR) image can more accurately represent dark areas (e.g., shadows) and well-lit areas (e.g., sunlight), as an HDR image generally includes more possible values of brightness (e.g., luminance). In some examples, an HDR image can be generated by combining multiple LDR images at different exposure settings.

Image capture devices may include multiple image sensors and/or multiple lenses that may be used to support various imaging techniques, such as high dynamic range (HDR) imaging, multi-frame HDR (MFHDR) imaging, etc. The image sensors, in turn, may transfer the image data to a camera processor. Example lens types include wide-angle lenses, ultra-wide-angle lenses, telephoto lenses, telescope lenses, periscope-style zoom lenses, fisheye lenses, macro lenses, prime lenses, or various combinations thereof. As an example, an image capture device having a dual-camera configuration may include a wide lens and a telephoto lens. Similarly, a triple-camera configuration may include an ultra-wide lens, in addition to a wide lens and a telephoto lens. By using multiple lenses and/or image sensors, camera processors of image capture devices may capture images having various fields-of-view (FOVs), adjust zoom levels, apply focusing effects, and/or create one or more composite frames of image data (e.g., images generated from a combination of multiple images).

SUMMARY

In general, this disclosure describes camera processing techniques involving high dynamic range (HDR) imaging. An image capture device may be configured to capture one or more images using one a plurality of image capture techniques, including HDR image capture techniques. The various image capture techniques available to an image capture device may be more or less susceptible to ghosting effects. Ghosting effects typically occur in a multi-frame image capture technique where multiple images are captured and fused together. Because the multiple images are captured over a period of time, if there is an object in the scene that is moving quickly relative to the time delay in capturing the multiple images, some objects in the scene may not be in the same place in the different images that are captured. This situation may result in motion blur or "ghosting" in the image formed by fusing the multiple images that were captured.

Additionally, the various image capture techniques, including HDR image capture techniques, available to an image capture device may exhibit higher or lower signal-to-noise ratios (SNRs) based on the characteristics of the scene being captured. For example, binning sensors, such as Quad-Bayer Color Filter Array (QCFA) sensors, may be configured to average the value of four adjacent color sensors to produce a final output pixel. In binning mode, a QCFA sensor generally has a high SNR, especially when compared to non-binning sensors in low light environments. However, in some HDR image capture modes, a QCFA sensor does not use the full amount of binning available, and thus, may produce images with a lower SNR for some scenes.

In view of these problems, this disclosure describes techniques for determining an image capture technique from among a plurality of image capture techniques. In one example, an image capture device may analyze a histogram of brightness values of the pixels of a preview image in order to determine if the scene to be captured is an HDR scene or is not an HDR scene. In general, an HDR scene will have a relatively high percentage of brightness values in both an undersaturated (e.g., very dark) region and an oversaturated (e.g., very bright) region of the histogram. If the image capture device determines that the preview image is not an HDR scene, the image capture device may be configured to capture subsequent images using a single frame image capture technique (e.g., a single binning frame). Use of a single frame image capture technique greatly reduces and/or eliminates the possibility for ghosting in the image because only a single image is captured at a time (e.g., no image fusing is performed). In addition, the use of a single frame image capture technique (e.g., a binning frame) generally results in a high SNR in the resulting image.

If the image capture device determines that the preview image is an HDR scene, the image capture device may then determine to use one of a plurality of HDR capture techniques based on motion detected in the preview image, and if there is motion, the location of the motion in the image. For example, if the image capture device determines that the scene is an HDR scene (e.g., based on the histogram as described above), and also determines that there is no motion in the scene, the image capture device may determine to use an HDR image capture technique that captures and fuses together multiple frames (e.g. MFHDR). While MFHDR is susceptible to ghosting, MFHDR generally produces an image with a high SNR. However, because the image capture device determined that there was no motion detected in the preview image, MFHDR can be used since the probability of ghosting is low.

If the image capture device determines that the scene is an HDR scene (e.g., based on the histogram as described above), and also determines that there is motion in the scene, the image capture device may further determine whether or not the motion is in a dark region of the image. If the motion is not in a dark region (e.g., the motion is in a bright region of the image), the image capture device may choose to use a single frame HDR technique. A single frame HDR technique is not susceptible to ghosting, but may provide for a generally lower SNR. If the motion is in a dark region, the image capture device may choose to fuse an image from a single frame HDR technique with another image captured using a binning mode. Fusing a single frame HDR image with a binning frame provides for a high SNR, while also being less susceptible to ghosting in bright areas. Since the motion was in a dark area of the image, the likelihood of ghosting effects being in the image are lowered. In general, the techniques of this disclosure may result in a more optimal selection of image capture techniques such that HDR scenes are captured with high SNR and minimal to no ghosting.

In one example, the techniques of the disclosure are directed a method comprising receiving a preview image, determining if the preview image is a high dynamic range (HDR) scene based on brightness values of pixels of the preview image, determining to use a single frame image capture technique based on a determination that the preview image is not an HDR scene, determining to use one of a plurality of HDR image capture techniques based on a determination that the preview image is an HDR scene, and further based on motion detected in the preview image, and generating an output image using one or more images captured using the single frame image capture technique or one of the plurality of HDR image capture techniques.

In another example, the techniques of the disclosure are directed to a device configured for camera processing, the device comprising a memory configured to receive a preview image, determine if the preview image is a high dynamic range (HDR) scene based on brightness values of pixels of the preview image, determine to use a single frame image capture technique based on a determination that the preview image is not an HDR scene, determine to use one of a plurality of HDR image capture techniques based on a determination that the preview image is an HDR scene, and further based on motion detected in the preview image, and generate an output image using one or more images captured using the single frame image capture technique or one of the plurality of HDR image capture techniques.

The disclosure also describes means for performing any of the techniques described herein. In an example, the techniques of the disclosure are directed to an apparatus configured to perform camera processing, the apparatus comprising means for receiving a preview image, means for determining if the preview image is a high dynamic range (HDR) scene based on brightness values of pixels of the preview image, means for determining to use a single frame image capture technique based on a determination that the preview image is not an HDR scene, means for determining to use one of a plurality of HDR image capture techniques based on a determination that the preview image is an HDR scene, and further based on motion detected in the preview image, and means for generating an output image using one or more images captured using the single frame image capture technique or one of the plurality of HDR image capture techniques.

In another example, this disclosure describes a non-transitory computer-readable storage medium storing instructions that, when executed, cause one or more processors to receive a preview image, determine if the preview image is a high dynamic range (HDR) scene based on brightness values of pixels of the preview image, determine to use a single frame image capture technique based on a determination that the preview image is not an HDR scene, determine to use one of a plurality of HDR image capture techniques based on a determination that the preview image is an HDR scene, and further based on motion detected in the preview image, and generate an output image using one or more images captured using the single frame image capture technique or one of the plurality of HDR image capture techniques.

This summary is intended to provide an overview of the subject matter described in this disclosure. It is not intended to provide an exclusive or exhaustive explanation of the systems, device, and methods described in detail within the accompanying drawings and description herein. Further details of one or more examples of the disclosed technology are set forth in the accompanying drawings and in the description below. Other features, objects, and advantages of the disclosed technology will be apparent from the description, drawings, and claims.

BRIEF DESCRIPTION OF DRAWINGS

Like reference characters denote like elements throughout the description and figures.

DETAILED DESCRIPTION

Figure 1:
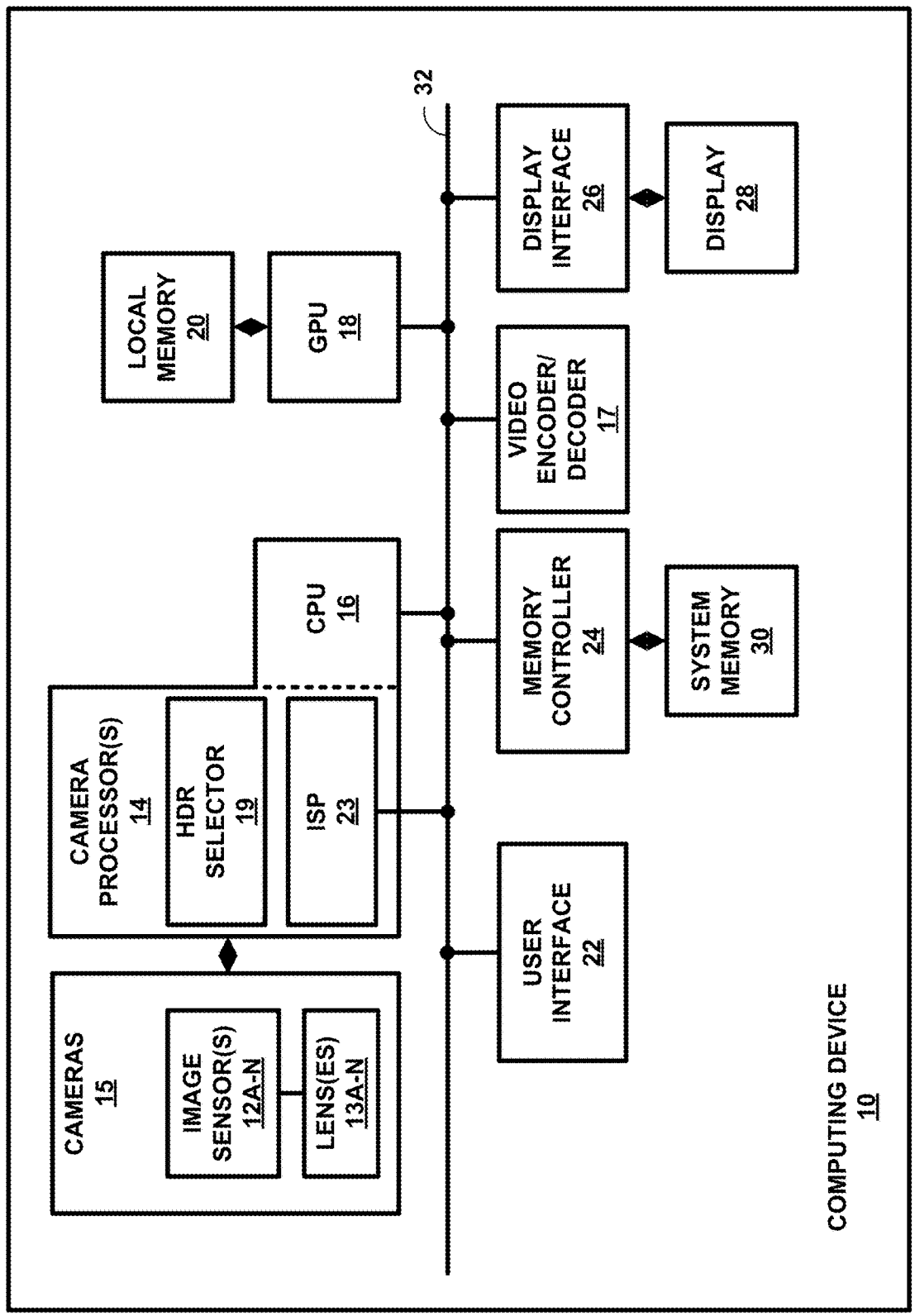
FIG. 1 is a block diagram of a device configured to perform one or more of the example techniques described in this disclosure.

High dynamic range (HDR) imaging includes image capture techniques used to reproduce a wider dynamic range image of brightness values in an image. HDR imaging may be particularly useful for scenes that include both a very dark area and a very bright area. Traditional, single-frame image capture modes may not be capable of preserving detail in both very bright and very dark areas.

In most imaging devices, the degree of exposure of light applied to an image sensor can be altered in one of two ways: by either increasing/decreasing the size of an aperture or by increasing/decreasing the time of each exposure (e.g., by adjusting a shutter speed). Due to the physics of camera sensors, it may not be possible to capture all of the brightness values present in a scene that has a very wide range of brightness values (e.g., a scene that exhibits a high dynamic range). That is, a camera sensor may not be capable of recording all of the brightness values in a scene that are perceptible by the human eye.

For example, to maintain detail in darker areas of a scene, a camera may decrease the shutter speed and/or increase the aperture size. However, this will cause brighter areas to be over exposed (e.g., the image sensor output will output the maximum brightness value for many different actual brightness values), and detail will be lost in brighter areas. To maintain detail in brighter areas, a camera may increase the shutter speed and/or decrease the aperture size. However, this will cause darker areas to be under exposed (e.g., the image sensor output will output the minimum brightness value for many different actual brightness values), and detail will be lost in these darker areas.

In some examples, a camera device may be configured to generate an HDR image by capturing multiple images at varying exposure settings and then combining the multiple images to form a final image that more accurately represents all of the brightness values present in the seen. This capture technique is sometimes called multi-frame HDR (MFHDR). In some examples, exposure variation for HDR generation is done by only altering the exposure time and not the aperture size. This is because altering the aperture size may also affect the depth of field of each of the output images, which may not be desirable in some applications. In other applications, the camera may adjust both aperture and shutter speed to output the multiple images used to form an HDR image. A camera may also be configured to capture HDR images using a single frame, in-sensor HDR technique to generate wider dynamic range images and to preserve the details of highlights and in bright and dark areas of a scene. In general, MFHDR may produce images with a higher signal-to-noise ratio (SNR), but may be more susceptible to ghosting (e.g., motion blur) due to capturing multiple, successive images over a period of time. In-sensor, single frame HDR techniques are less susceptible to ghosting, but may produce images with lower SNR relative to MFHDR techniques.

As can be seen from the above examples, using a single HDR image capture technique may not be appropriate for all HDR scenes. Some HDR image capture techniques may be susceptible to ghosting, while other HDR image capture techniques may be free of ghosting, but may produce images with a less than desirable SNR. In view of these drawbacks, this disclosure describes techniques that involve analyzing a scene from a preview image and determining one of a plurality of HDR image capture techniques to use to capture and generate an HDR image based on the analysis.

A camera device may be configured to determine the HDR image capture technique to use based on one or more of a histogram of brightness values in the preview image (e.g., to identify an HDR scene), motion detected in the preview image, and/or the specific area in the preview image in which image motion was detected (e.g., a dark or light area). In this way, the techniques of the disclosure may allow a camera device to select an HDR image capture technique that will produce images with high SNR with a low probability of ghosting artifacts.

FIG. 1 is a block diagram of a computing device 10 configured to perform one or more of the example techniques described in this disclosure for determining an HDR image capture technique. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device, such as a portable video game device or a personal digital assistant (PDA), a drone device, or any device that may include one or more cameras. In some examples, computing device 10 may include one or more camera processor(s) 14, a central processing unit (CPU) 16, a video encoder/decoder 17, a graphics processing unit (GPU) 18, local memory 20 of GPU 18, user interface 22, memory controller 24 that provides access to system memory 30, and display interface 26 that outputs signals that cause graphical data to be displayed on display 28.

As illustrated in the example of FIG. 1, computing device 10 includes one or more image sensor(s) 12A-N. Image sensor(s) 12A-N may be referred to in some instances herein simply as "sensor 12," while in other instances may be referred to as a plurality of "sensors 12" where appropriate. Sensors 12 may be any type of image sensor, including sensors that include a Bayer filter, or HDR interlaced sensors, such as a Quad-Bayer sensor or a Quad-Bayer color filter array (QCFA) sensor.

Computing device 10 further includes one or more lens(es) 13A-N. Similarly, lens(es) 13A-N may be referred to in some instances herein simply as "lens 13," while in other instances may be referred to as a plurality of "lenses 13" where appropriate. In some examples, sensor(s) 12 represent one or more image sensors 12 that may each include processing circuitry, an array of pixel sensors (e.g., pixels) for capturing representations of light, memory, such as buffer memory or on-chip sensor memory, etc. In some examples each of image sensors 12 may be coupled with a different type of lens 13, each lens and image sensor combination having different apertures and/or fields-of-view. Example lenses may include a telephoto lens, a wide angle lens, an ultra-wide angle lens, or other lens types.

As shown in FIG. 1, computing device 10 includes multiple cameras 15. As used herein, the term "camera" refers to a particular image sensor 12 of computing device 10, or a plurality of image sensors 12 of computing device 10, where the image sensor(s) 12 are arranged in combination with one or more lens(es) 13 of computing device 10. That is, a first camera 15 of computing device 10 refers to a first collective device that includes one or more image sensor(s) 12 and one or more lens(es) 13, and a second camera 15, separate from the first camera 15, refers to a second collective device that includes one or more image sensor(s) 12 and one or more lens(es) 13. In addition, image data may be received from image sensor(s) 12 of a particular camera 15 by camera processor(s) 14 or CPU 16. That is, camera processor(s) 14 or CPU 16 may, in some examples, receive a first set of frames of image data from a first image sensor 12 of a first camera 15 and receive a second set of frames of image data from a second image sensor 12 of a second camera 15.

In an example, the term "camera" as used herein refers to a combined image sensor 12 and lens 13 that, coupled together, are configured to capture at least one frame of image data and transfer the at least one frame of the image data to camera processor(s) 14 and/or CPU 16. In an illustrative example, a first camera 15 is configured to transfer a first frame of image data to camera processor(s) 14 and a second camera 15 is configured to transfer a second frame of image data to camera processor(s) 14, where the two frames are captured by different cameras as may be evidenced, for example, by the difference in FOV and/or zoom level of the first frame and the second frame. The difference in FOV and/or zoom level may correspond to a difference in focal length between the first camera 15 and the second camera 15.

Computing device 10 may include dual lens devices, triple lens devices, 360-degree camera lens devices, etc. As such, each lens 13 and image sensor 12 combination may provide various zoom levels, angles of view (AOV), focal lengths, fields of view (FOV), etc. In some examples, particular image sensors 12 may be allocated for each lens 13, and vice versa. For example, multiple image sensors 12 may be each allocated to different lens types (e.g., wide lens, ultra-wide lens, telephoto lens, and/or periscope lens, etc.).

Camera processor(s) 14 may be configured to control the operation of cameras 15 and perform processing on images received from cameras 15. In some examples, camera processor(s) 14 may include an image signal processor (ISP) 23. For instance, camera processor(s) 14 may include circuitry to process image data. Camera processor(s) 14, including ISP 23, may be configured to perform various operations on image data captured by image sensors 12, including auto white balance, color correction, or other post-processing operations. FIG. 1 shows a single ISP 23 configured to operate on the output of cameras 15. In other examples, camera processor(s) 14 may include an ISP 23 for each of cameras 15 in order to increase processing speed and/or improve synchronization for simultaneous image capture from multiple cameras of cameras 15.

In some examples, camera processor(s) 14 may execute "3A" algorithms. Such algorithms may include autofocus (AF), auto exposure control (AEC), and auto white balance (AWB) techniques. In such examples, 3A may represent the functionality of a statistics algorithm processing engine, where one of camera processor(s) 14 may implement and operate such a processing engine.

In some examples, camera processor(s) 14 are configured to receive image frames (e.g., pixel data) from image sensor(s) 12, and process the image frames to generate image and/or video content. For example, image sensor(s) 12 may be configured to capture individual frames, HDR frames, frame bursts, frame sequences for generating video content, photo stills captured while recording video, preview frames, or motion photos from before and/or after capture of a still photograph. CPU 16, GPU 18, camera processor(s) 14, or some other circuitry may be configured to process the image and/or video content captured by sensor(s) 12 into images or video for display on display 28. Image frames may generally refer to frames of data for a still image or frames of video data or combinations thereof, such as with motion photos. Camera processor(s) 14 may receive from sensor(s) 12 pixel data of the image frames in any format. For example, the pixel data may include different color formats, such as RGB, YCbCr, YUV, etc. In any case, camera processor(s) 14 may receive, from image sensor(s) 12, a plurality of frames of image data.

In examples including multiple camera processor(s) 14, camera processor(s) 14 may share sensor(s) 12, where each of camera processor(s) 14 may interface with each of sensor(s) 12. In any event, camera processor(s) 14 may initiate capture of a video or image of a scene using a plurality of pixel sensors of sensor(s) 12. In some examples, a video may include a sequence of individual frames. As such, camera processor(s) 14 causes sensor(s) 12 to capture the image using the plurality of pixel sensors.

Sensor(s) 12 may then output pixel information to camera processor(s) 14 (e.g., pixel values, luma values, color values, charge values, Analog-to-Digital Units (ADU) values, etc.), the pixel information representing the captured image or sequence of captured images. In some examples, camera processor(s) 14 may process monochrome and/or color images to obtain an enhanced color image of a scene. In some examples, camera processor(s) 14 may determine universal blending weight coefficient(s) for different types of pixel blending or may determine different blending weight coefficient(s) for blending different types of pixels that make up a frame of pixels (e.g., a first blending weight coefficient for blending pixels obtained via a monochrome sensor of first camera 15 and pixels obtained via a monochrome sensor of second camera 15, a second blending weight coefficient for blending pixels obtained via a Bayer sensor of first camera 15 and pixels obtained via a Bayer sensor of second camera 15, etc.).

In an example of the disclosure, camera processor(s) 14 may cause a particular image sensor of image sensors 12 to capture one or more images in an HDR mode. In some examples, camera processor(s) 14 and/or cameras 15 may be configured to capture and generate an HDR image according to one of a plurality of HDR capture techniques.

In one example, camera processor(s) 14 may cause an image sensor 12 to capture a plurality of images (e.g., three) at different exposure settings (e.g., a long exposure, a medium exposure, and a short exposure). Such a technique is sometimes referred to as multi-frame HDR (MFHDR). In one example, camera processor(s) 14 may be configured to cause an image sensor 12 to generate multiple images at different shutter speeds, but the same aperture size. An image senor 12 may output the plurality of images at a particular field-of-view (FOV), e.g., based on a zoom setting and the type of lens selected (e.g., telephoto, wide, ultra-wide, etc.), and at a particular resolution. ISP 23 may receive the plurality of images and may, in addition to any 3A or other processing, perform a MFHDR processing technique to combine the multiple images into an HDR image.

In another example, camera processor(s) 14 may generate an HDR image using a single frame output from one of cameras 15. Single-frame HDR may include the use histogram equalization post-processing of a single image, a technique sometimes referred to as local tone mapping (LTM). In other examples, as will be explained below, camera processor(s) 14 may instruct one of cameras 15 to capture a single-frame HDR image using an in-sensor Quad-Bayer Coding (QBC) HDR technique. An in-sensor QBC HDR technique may include capturing a single image where a first portion of the pixel sensors of image sensor 12 capture light with a long exposure, a second portion of the pixel sensors of image sensor 12 capture light with a medium-length exposure, and a third portion of the pixel sensors of image sensor 12 capture light with a short exposure.

In other examples, camera processor(s) 14 may generate an HDR image from the output of one of cameras 15 using a binning frame with adaptive dynamic range coding (ADRC). When performing ADRC, camera processor(s) 14 may preserve high brightness areas of an image by capturing the image with a lower sensor exposure. Camera processor(s) 14 may then apply a digital gain to the output image to compensate for overall brightness.

Another example technique for generating HDR images is a staggered multi-frame HDR image capture technique. In a staggered multi-frame HDR image capture technique, camera processor(s) 14 may be configured to cause a camera 15 to capture multiple images using multiple rolling shutters. A rolling shutter does not generate an image from an entire scene at one time instance, but rather generates an image by scanning either rows or columns of an image sensor 12. For example, camera 15 may combine a long period rolling shutter capture with a short period rolling shutter capture. Camera 15 may row interleave the output of the two rolling shutters.

The various image capture techniques available to computing device 10 may be more or less susceptible to ghosting effects. Ghosting effects typically occur in an HDR image capture technique where multiple images are captured and fused together (e.g., MFHDR). Because the multiple images are captured over a period of time, if there is an object in the scene that is moving quickly relative to the time delay in capturing the multiple images, some objects in the scene may not be in the same place in the different images that are captured. This situation may result in motion blur or "ghosting" in the image formed by fusing the multiple images that were captured.

Additionally, the various image capture techniques, including HDR image capture techniques, available to computing device 10 may exhibit higher or lower signal-to-noise ratios (SNRs) based on the characteristics of the scene being captured. For example, one of image sensors 12 may be a binning sensor, such as a Quad-Bayer Color Filter Array (QCFA) sensor. A QCFA sensor may be configured to average the value of four adjacent color sensors to produce a final output pixel. In binning mode, a QCFA sensor generally has a high SNR, especially when compared to non-binning sensors in low light environments. However, in some HDR image capture modes, a QCFA sensor does not use the full amount of binning available, and thus, may produce images with a lower SNR for some scenes.

In view of these problems, this disclosure describes techniques for determining an image capture technique from among a plurality of image capture techniques. In one example, HDR selector 19 may analyze a histogram of brightness values of the pixels of a preview image captured by one of image sensors 12 in order to determine if the scene to be captured is an HDR scene or is not an HDR scene. In general, an HDR scene will have a relatively high percentage of brightness values in both an undersaturated (e.g., very dark) region and an oversaturated (e.g., very bright) region of the histogram. If HDR selector 19 determines that the preview image is not an HDR scene, camera processor(s) 14 may be configured to capture subsequent images using a single frame image capture technique (e.g., a single binning frame). Use of a single frame image capture technique greatly reduces and/or eliminates the possibility for ghosting in the image because only a single image is captured at a time (e.g., no image fusing is performed). In addition, the use of a single frame image capture technique (e.g., a binning frame) generally results in a high SNR in the resulting image.

If HDR selector 19 determines that the preview image is an HDR scene, HDR selector 19 may then determine to use one of a plurality of HDR capture techniques based on motion detected in the preview image, and if there is motion detected, HDR selector 19 may further determine the HDR capture technique based on the location of the motion in the preview image. For example, if HDR selector 19 determines that the scene is an HDR scene (e.g., based on the histogram as described above), and also determines that there is no motion in the scene, HDR selector 19 may determine to use an HDR image capture technique that captures and fuses together multiple frames (e.g. MFHDR). While MFHDR is susceptible to ghosting, MFHDR generally produces an image with a high SNR. However, because HDR selector 19 determined that there was no motion detected in the preview image, MFHDR can be used as the probability of ghosting is low.

If HDR selector 19 determines that the scene is an HDR scene (e.g., based on the histogram as described above), and also determines that there is motion in the scene, HDR selector 19 may further determine whether or not the motion is in a dark region of the image. If the motion is not in a dark region (e.g., the motion is in a bright region of the image), HDR selector 19 may choose to use a single frame HDR technique. A single frame HDR technique is not susceptible to ghosting, but may provide for a generally lower SNR. If the motion is in a dark region, HDR selector 19 may choose to fuse an image from a single frame HDR technique with another image captured using a binning mode. Fusing a single frame HDR image with a binning frame provides for a high SNR, while also being less susceptible to ghosting in bright areas. Since the motion was in a dark area of the image, the likelihood of ghosting effects being in the image are lowered. In general, the techniques of this disclosure may result in a more optimal selection of image capture techniques such that HDR scenes are captured with high SNR and minimal to no ghosting.

In one example, camera processor(s) 14 may divide the preview frame into a plurality of regions (e.g., 64×48 pixel regions). HDR selector 19 may obtain luma information (e.g., average luma information) for each of the regions from AEC performed by ISP 23. HDR selector 19 may determine if a region is dark based on the luma information of the region compared to a threshold.

According to one example of the disclosure, camera processor(s) 14 may be configured to receive a preview image, determine if the preview image is an HDR scene based on brightness values of pixels of the preview image, determine to use a single frame image capture technique based on a determination that the preview image is not an HDR scene, determine to use one of a plurality of HDR image capture techniques based on a determination that the preview image is an HDR scene, and further based on motion detected in the preview image, and generate an output image using one or more images captured using the single frame image capture technique or one of the plurality of HDR image capture techniques.

Additional details concerning the operation of HDR selector 19 are described in more detail below with reference to FIGS. 2-10. As will be explained in greater detail below, camera processor(s) 14 may include and/or be configured to execute an HDR selector 19. That is, HDR selector 19 may be software executed by camera processor(s) 14, may be firmware executed by camera processor(s) 14, or may be dedicated hardware within camera processor(s) 14. FIG. 1 shows HDR selector 19 as being separate from ISP 23, but in some examples HDR selector 19 may be part of ISP 23.

Although the various structures of computing device 10 are illustrated as separate in FIG. 1, the techniques of this disclosure are not so limited, and in some examples the structures may be combined to form a system on chip (SoC). As an example, camera processor(s) 14, CPU 16, GPU 18, and display interface 26 may be formed on a common integrated circuit (IC) chip. In some examples, one or more of camera processor(s) 14, CPU 16, GPU 18, and display interface 26 may be formed on separate IC chips. In addition, in some examples, HDR selector 19 of camera processor(s) 14 may be part of ISP 23. In other examples, HDR selector 19 may be implemented in software and be executed by CPU 16. Various other permutations and combinations are possible, and the techniques of this disclosure should not be considered limited to the example illustrated in FIG. 1. In an example, CPU 16 may include camera processor(s) 14 such that one or more of camera processor(s) 14 are part of CPU 16. In such examples, CPU 16 may be configured to perform one or more of the various techniques otherwise ascribed herein to camera processor(s) 14. For purposes of this disclosure, camera processor(s) 14 will be described herein as being separate and distinct from CPU 16, although this may not always be the case.

The various structures illustrated in FIG. 1 may be configured to communicate with each other using bus 32. Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different structures shown in FIG. 1 is merely exemplary, and other configurations of computing devices and/or other image processing systems with the same or different structures may be used to implement the techniques of this disclosure.

In addition, the various components illustrated in FIG. 1 (whether formed on one device or different devices), including sensor(s) 12 and camera processor(s) 14, may be formed as at least one of fixed-function or programmable circuitry, or a combination of both, such as in one or more microprocessors, application specific integrated circuits (ASICs), field programmable gate arrays (FPGAs), digital signal processors (DSPs), or other equivalent integrated or discrete logic circuitry. In addition, examples of local memory 20 include one or more volatile or non-volatile memories or storage devices, such as random-access memory (RAM), static RAM (SRAM), dynamic RAM (DRAM), erasable programmable ROM (EPROM), electrically erasable programmable ROM (EEPROM), flash memory, a magnetic data media or an optical storage media.

In some examples, memory controller 24 may facilitate the transfer of data going into and out of system memory 30. For example, memory controller 24 may receive memory read and write commands, and service such commands with respect to memory 30 in order to provide memory services for various components of computing device 10. In such examples, memory controller 24 may be communicatively coupled to system memory 30. Although memory controller 24 is illustrated in the example of computing device 10 of FIG. 1 as being a processing circuit that is separate from both CPU 16 and system memory 30, in some examples, some or all of the functionality of memory controller 24 may be implemented on one or more of CPU 16, system memory 30, camera processor(s) 14, video encoder/decoder 17, and/or GPU 18.

System memory 30 may store program modules and/or instructions and/or data that are accessible by camera processor(s) 14, CPU 16, and/or GPU 18. For example, system memory 30 may store user applications (e.g., instructions for a camera application), resulting images from camera processor(s) 14, etc. System memory 30 may additionally store information for use by and/or generated by other components of computing device 10. For example, system memory 30 may act as a device memory for camera processor(s) 14. System memory 30 may include one or more volatile or non-volatile memories or storage devices, such as, for example, RAM, SRAM, DRAM, ROM, EPROM, EEPROM, flash memory, a magnetic data media or an optical storage media. In addition, system memory 30 may store image data (e.g., frames of video data, encoded video data, sensor-mode settings, zoom settings, 3A parameters, etc.). In some examples, system memory 30 or local memory 20 may store the image data to on-chip memory, such as in a memory buffer of system memory 30 or local memory 20. In another example, system memory 30 or local memory 20 may output image data in order to be stored external from the memory of a chip or buffer, such as to a secure digital (SD™) card of a camera device or in some instances, to another internal storage of a camera device. In an illustrative example, system memory 30 or local memory 20 may be embodied as buffer memory on a camera processor(s) 14 chip, GPU 18 chip, or both where a single chip includes both processing circuitries.

In some examples, system memory 30 may include instructions that cause camera processor(s) 14, CPU 16, GPU 18, and/or display interface 26 to perform the functions ascribed to these components in this disclosure. Accordingly, system memory 30 may be a computer-readable storage medium having instructions stored thereon that, when executed, cause one or more processors (e.g., camera processor(s) 14, CPU 16, GPU 18, and display interface 26) to perform the various techniques of this disclosure.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

In addition, camera processor(s) 14, CPU 16, and GPU 18 may store image data, user interface data, etc., in respective buffers that are allocated within system memory 30. Display interface 26 may retrieve the data from system memory 30 and configure display 28 to display the image represented by the image data, such as via a user interface 22 screen. In some examples, display interface 26 may include a digital-to-analog converter (DAC) that is configured to convert digital values retrieved from system memory 30 into an analog signal consumable by display 28. In other examples, display interface 26 may pass the digital values directly to display 28 for processing.

Computing device 10 may include a video encoder and/or video decoder 17, either of which may be integrated as part of a combined video encoder/decoder (CODEC) (e.g., a video coder). Video encoder/decoder 17 may include a video coder that encodes video captured by one or more camera(s) 15 or a decoder that can decode compressed or encoded video data. In some instances, CPU 16 and/or camera processor(s) 14 may be configured to encode and/or decode video data, in which case, CPU 16 and/or camera processor(s) 14 may include video encoder/decoder 17.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a camera application, a graphics editing application, a media player application, a video game application, a graphical user interface application or another program. For example, a camera application may allow the user to control various settings of camera 15. The user may provide input to computing device 10 via one or more input devices (not shown) such as a keyboard, a mouse, a microphone, a touch pad or another input device that is coupled to computing device 10 via user interface 22.

One example software application is a camera application. CPU 16 executes the camera application, and in response, the camera application causes CPU 16 to generate content that display 28 outputs. For instance, display 28 may output information such as light intensity, whether flash is enabled, and other such information. The camera application may also cause CPU 16 to instruct camera processor(s) 14 to process the images output by sensor 12 in a user-defined manner. The user of computing device 10 may interface with display 28 (e.g., via user interface 22) to configure the manner in which the images are generated (e.g., with zoom settings applied, with or without flash, focus settings, exposure settings, video or still images, and other parameters). For example, CPU 16 may receive via user interface 22 an instruction to capture images in an HDR mode (e.g., capture and generate an HDR image). As was described above, in response to a user indicating the use of an HDR mode, HDR selector 19 may be configured to determine to use one of a plurality of HDR image capture techniques based on an analysis of a preview image. In some examples, HDR selector 19 may be configured to determine to use one of a plurality of HDR image capture techniques regardless of whether or not the use has selected an HDR mode. That is, HDR selector 19 may be configured to automatically determine one of a plurality of HDR modes.

Display 28 may include a monitor, a television, a projection device, an HDR display, a liquid crystal display (LCD), a plasma display panel, a light emitting diode (LED) array, an organic LED (OLED), electronic paper, a surface-conduction electron-emitted display (SED), a laser television display, a nanocrystal display or another type of display unit. Display 28 may be integrated within computing device 10. For instance, display 28 may be a screen of a mobile telephone handset, a tablet computer, or a laptop. Alternatively, display 28 may be a stand-alone device coupled to computing device 10 via a wired or wireless communications link. For instance, display 28 may be a computer monitor or flat panel display connected to a personal computer via a cable or wireless link. Display 28 may provide preview frames that a user may view to see what is being stored or what a picture might look like if camera 15 were to actually take a picture or start recording video.

In some examples, camera processor(s) 14 may output a flow of frames to memory controller 24 in order for the output frames to be stored as a video file. In some examples, CPU 16, video encoder/decoder 17, and/or camera processor(s) 14 may output an HDR image (e.g., with or without a bokeh effect) to be stored as a video file. In some examples, memory controller 24 may generate and/or store the output frames in any suitable video file format. In some examples, video encoder/decoder 17 may encode the output frames prior to CPU 16, video encoder/decoder 17, and/or camera processor(s) 14 causing the output frames to be stored as an encoded video. Encoder/decoder 17 may encode frames of image data using various encoding techniques, including those described in standards defined by MPEG-2, MPEG-4, ITU-T H.263, ITU-T H.264/MPEG-4, Part 10, Advanced Video Coding (AVC), ITU-T H.265/High Efficiency Video Coding (HEVC), Versatile Video Coding (VCC), etc., and extensions thereof. In a non-limiting example, CPU 16, video encoder/decoder 17, and/or camera processor(s) 14 may cause the output frames to be stored using a Moving Picture Experts Group (MPEG) video file format.

Figure 2:
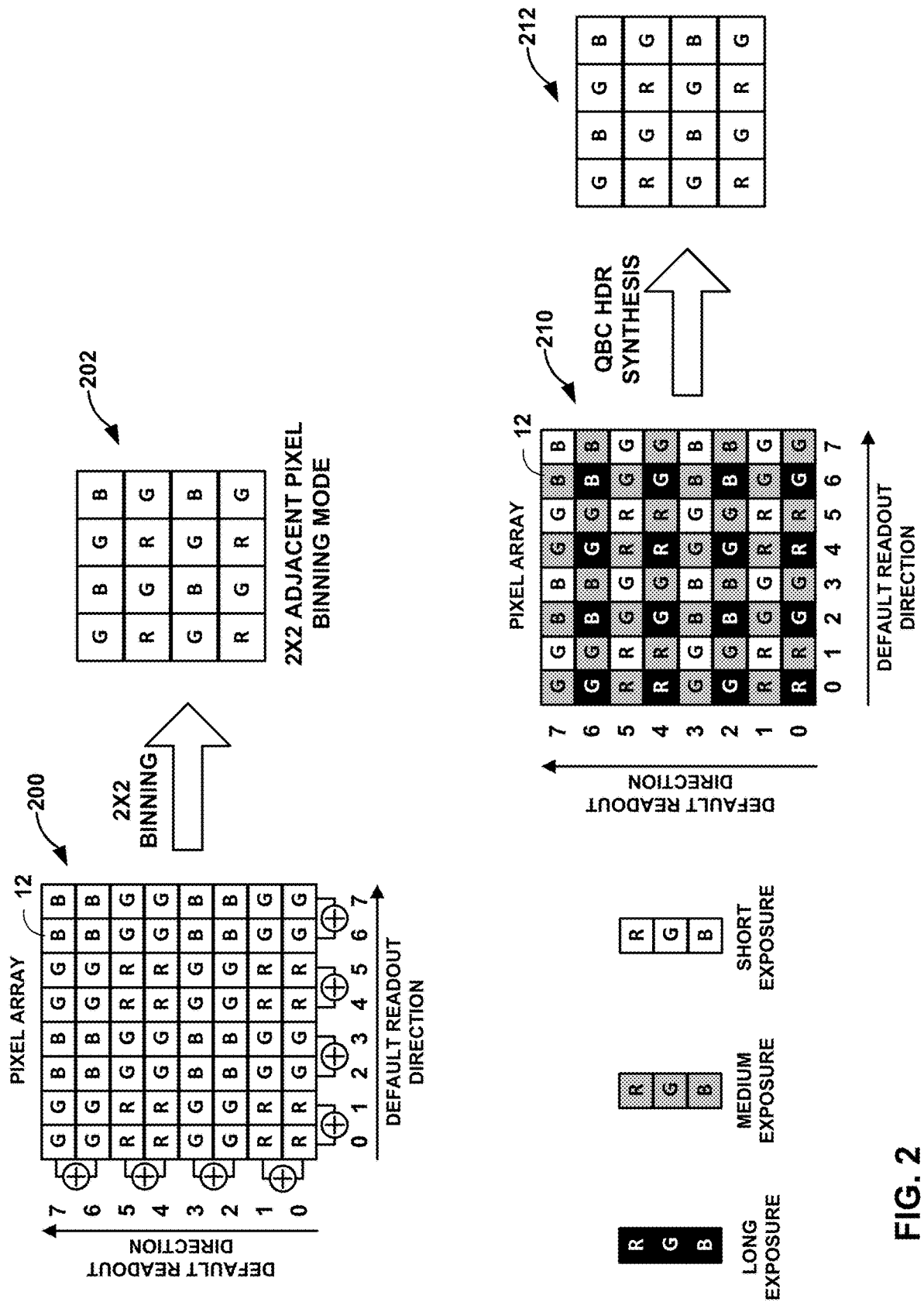
FIG. 2 is a conceptual diagram showing example image sensor and image capture modes.

FIG. 2 is a conceptual diagram showing example image sensor and image capture modes. FIG. 2 depicts a portion of an image sensor 12 that is capable of operating in both a binning mode 200 and an in-sensor QBC HDR mode 210. In this example, image sensor 12 is a QCFA sensor that may be configured to output a standard Bayer raw image in either binning mode 200 or in-sensor QBC HDR mode 210, among other modes. An example of image sensor 12 is an IMX686 sensor made by Sony Corporation. In one example, the size of the pixel sensors of image sensor 12 is 0.8 um.

In some examples, sensor 12 may be capable of outputting images at a first, higher resolution (e.g., 48 megapixels (MP) or other) in a remosaicing mode, and outputting images at as second, lower resolution (e.g., 12 MP or another reduction from the maximum resolution) in binning mode 200. FIG. 2 shows an example of 2×2 binning, where four adjacent pixel sensors are averaged to form a single value, as shown in sensor portion 202. In other examples, other levels of binning may be used. In general, in a binning mode, image sensor 12 may be configured to average adjacent pixels (e.g., 2 or 4 adjacent pixels) having the same color filter to provide a higher SNR for low light image capture. While lower in resolution compared to a remosaicing mode (e.g., no binning), binning mode 200 captures more light per output pixel as compared to a remosaicing mode, thus increasing the SNR of images output from binning mode. This is because binning mode averages four pixel sensors per output pixel, thus increasing the effective size of the pixel sensor (e.g., from 0.8× to 3.2 um in this example).

In FIG. 2, image sensor 12 has a Quad-Bayer mosaic pattern. In one example, each 16×16 portion of a QCFA sensor may include four adjacent red color filters, four adjacent blue color filters, and two sets of four adjacent green color filters. Combined together, such a pattern may represent a wide range of colors. More green color filters are used because the human eye is more sensitive to green.

In some examples, camera processor(s) 14 may cause image sensor 12 to use binning mode 200 for MFHDR image capture. In MFHDR image capture, image sensor 12 may be configured to capture three or more successive images with different exposure times (e.g., a short, medium, and long exposure). For example, camera processor(s) 14 may execute an auto exposure algorithm that determines three or more different exposure settings for image sensor 12. For a three image example, camera processor(s) 14 may determine a short exposure time that preserves details in high brightness areas of a scene, may determine a long exposure time that boosts details in dark areas of a scene, and may determine a medium-length exposure time that maintains a more accurate brightness value of mid tones in the scene. Camera processor(s) 14 may then fuse the three or more images together to generate an HDR image.

Because MFHDR image capture includes fusing multiple images captured at different times, the resulting HDR image may exhibit ghosting artifacts and/or other motion blur distortions. As such, while the use of binning mode 200 for MFHDR generally results in an image with a SNR, images generated from MFHDR mode may be susceptible to ghosting if there is motion in the captured scene. In general, MFHDR using binning mode 200 results in images that have a wider dynamic range (e.g., as compared to a single binning frame), images that have improved SNR in the dark areas (e.g., compared to non-binding modes or modes with less binning), and images that may exhibit ghosting artifacts around fast moving objects in a captured scene.

In other examples, image sensor 12 may be configured to operate according to QBC HDR mode 210 (e.g., in-sensor QBC HDR mode). When operating according to QBC HDR mode 210, image sensor 12 may be configured to capture a single image. However, the image capture process and pixel fusion process is different from binning mode 210. As shown in FIG. 2, for QBC HDR mode 210, each 2×2 grid of color filters include one pixel sensor configured to capture a long exposure, two pixel sensors configured to capture medium length exposures, and one pixel sensor configured to capture a short exposure. Of course, other combination of exposure times could be used.

QBC HDR mode 210 allows the capture of light at different exposure times at the same time instance in order to generate an image with a wider dynamic range. The four pixels in each 2×2 color filter grid are fused into one pixel for each color channel, as shown in sensor portion 212. Compared to binning mode 200, images generated from QBC HDR mode 210 have a lower SNR because the pixels from the three exposure times that are fused together are from one or two pixel sensors, rather than four. However, because the three exposure times are being captured at approximately the same time with no time lag, images captured using QBC HDR mode 210 exhibit little to no ghosting. In general, QBC HDR mode 210 generates images that have a wider dynamic range compared to single frame binning modes, generates images with little to no ghosting compared to MFHDR mode, and generate images with lower SNR in dark areas of a scene compared to MFHDR mode.

Figure 3:
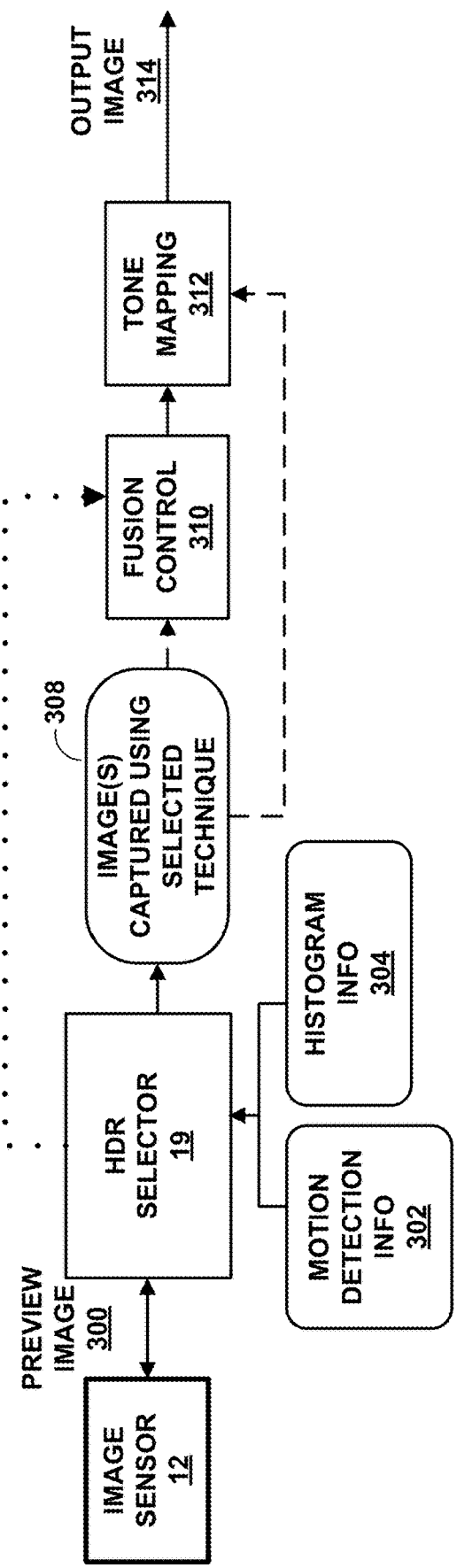
FIG. 3 is a block diagram illustrating example components of the computing device of FIG. 1 in greater detail.

FIG. 3 is a block diagram illustrating example components of the computing device of FIG. 1 in greater detail. The techniques of FIG. 3 will be described with respect to HDR selector 19. As described above, it should be understood that HDR selector 19 may be implemented in hardware, firmware, software, or any combination thereof, and may be part of camera processor(s) 14, ISP 23, CPU 16, and/or any other processing unit of computing device 10.

HDR selector 19 may be configured to receive a preview image 300 from image sensor 12. In this context, preview image 300 may be any image captured by image sensor 12 that is displayed to a user (e.g., on display 28) while using a camera application of computing device 10 and/or is used by camera processor(s) 14 to determine camera settings. Preview image 300 is typically not a "snapshot" that is to be saved on computing device 10, but rather is used by the user to arrange a scene to capture, and is used by ISP 23 to set camera functions (e.g., 3A settings). In accordance with the techniques of this disclosure, HDR selector 19 may be configured to analyze preview image 300 to determine one of a plurality of image capture techniques (e.g., HDR image capture techniques) to use to capture and generate an HDR image (e.g., output image 314). In some examples, HDR selector 19 may be configured to continuously analyze preview images (e.g., at a set time interval) to continuously update the determination of one of the plurality of image capture techniques, as lighting conditions and the scene can change over time. Computing device 10 may be configured to capture preview image 300 using any image capture mode. In some examples, computing device 10 may use in-sensor QBC HDR mode to capture preview image 300.

HDR selector 19 may first be configured to analyze histogram info 304 associated with preview image 300. Histogram info 304 may include a histogram of brightness values (e.g., luminance values) for each of the pixels of preview image 300. In some examples, HDR selector 19 or another functional unit of camera processor(s) 14 and/or CPU 16 may be configured to determine the histogram of the brightness values of the pixels of preview image 300. More information concerning the histogram information is discussed below with reference to FIG. 7.

In one example of the disclosure, HDR selector 19 may be configured to determine if preview image 300 is an HDR scene based on brightness values of pixels of the preview image. In general, an HDR scene will have a relatively high percentage of brightness values in both an undersaturated (e.g., very dark) region and an oversaturated (e.g., very bright) region of the histogram. If HDR selector 19 determines that the preview image is not an HDR scene, HDR selector 19 may be configured to capture subsequent images using a single frame image capture technique. That is, if the actual scene being captured does not have HDR characteristics (e.g., there are not a wide range of brightness values in the scene), using an HDR image capture technique may not provide any benefits, and may actually reduce the SNR of output image 314.

Instead, HDR selector 19 may determine to use a high SNR image capture technique. Examples of high SNR image capture techniques may include a single binning frame capture technique for adaptive dynamic range coding (ADRC), a single binning frame (e.g., 2×2 binning mode 200 of FIG. 2), and/or a single frame remosaicing mode. Use of a high SNR, single frame image capture technique greatly reduces and/or eliminates the possibility for ghosting in the image because only a single image is captured at a time (e.g., no image fusing is performed). In addition, the use of a single frame image capture technique (e.g., a binning frame) generally results in a high SNR in the resulting image.

If HDR selector 19 determines, based on histogram info 304, that preview image 300 is an HDR scene, HDR selector may then determine to use one of a plurality of HDR image capture techniques further based on motion detected in preview image 300. As described above, the plurality of HDR image capture techniques may include MFHDR, staggered HDR, in-sensor QBC HDR, as well as other HDR techniques. In addition, in accordance with the techniques of this disclosure, HDR selector 19 may further be configured to select an HDR capture technique that includes the use a QBC HDR frame fused with a single long exposure binning when there is motion detected, but the motion is not in a dark area of preview image 300.

Motion detection info 302 may include both an indication of whether or not there is motion detected in preview image 300, and where in preview image 300 the motion was detected. The location of the motion in preview image 300 may further include information of whether that location is a relatively dark or relatively bright area of preview image 300. Further description of motion detection information will be described below with reference to FIG. 6.

In one example of the disclosure, based on the determination that the preview image is an HDR scene, HDR selector 19 may be further configured to detect if motion is present in the preview image. The motion detection may be performed by HDR selector 19, or another functional unit of camera processor(s) 14 and/or CPU 16 may generate motion detection info 302 based on a comparison of preview image 300 and a previously captured preview image. HDR selector 19 may determine to use a first HDR image capture technique based on detecting that no motion is present in preview image 300, wherein the first HDR image capture technique includes capturing a plurality of images. In one example, the first HDR image capture technique is one of a multi-frame HDR (MFHDR) image capture technique or a staggered multi-frame HDR image capture technique. While MFHDR and other multiple frame HDR capture techniques are susceptible to ghosting, MFHDR generally produces an image with a high SNR. However, because the HDR selector 19 determined that there was no motion detected in preview image 300, MFHDR or other multiple frame HDR capture can be used as the probability of ghosting is low.

In other examples, based on the determination that preview image 300 is an HDR scene, HDR selector 19 may be further configured to detect if motion is present in preview image 300, and determine, based on detecting that motion is present in the preview image 300, if the motion is in a dark area of preview image 300. HDR selector 19 may determine to use a single-frame HDR image capture technique (e.g., in-sensor QBC HDR) based on determining that the motion is in the dark area of the preview image. A single frame HDR technique, such as QBC HDR is not susceptible to ghosting, but may provide for a generally lower SNR. However, increasing the SNR for the dark area may result in ghosting effects if motion is detected in the dark rea. Using QBC HDR for HDR scenes that have motion in a dark area of the scene may provide for the best trade-off between limiting ghosting artifacts and maintaining a high SNR.

HDR selector 19 may be configured to determine to use the single-frame HDR image capture technique (e.g., QBC HDR) together with a single frame image capture technique based on determining that the motion is not in the dark area of preview image 300. Fusing a single frame HDR image with an image from a single frame image capture (e.g., a long exposure binning frame) provides for a high SNR, particularly for the darker areas of the scene, while also being less susceptible to ghosting in bright areas.

HDR selector 19 may be further configured to determine a fusing weight, where more of the long exposure binning frame is fused (e.g., blended) together with the QBC HDR image in areas where the scene is dark, but there is no motion. For example, HDR selector 19 may be configured to determine the blending weight as a function of a pixel brightness value. For areas of the scene that are brighter, a lower amount of the long exposure binning frame (e.g., up to none) is fused together with the QBC HDR image. This is because HDR selector 19 detected motion in the bright area. Fusing the long exposure binning frame in bright areas of the scene with motion may result in ghosting. However, because the bright areas of the scene generally have a higher SNR than darker areas of the scene, a high overall SNR may still be obtained even if pixels from the QBC HDR image make up a majority of output image 314.

Based on the image capture technique selected by HDR selector 19, HDR selector 19 or another processing unit of computing device 10, may cause image sensor 12 to capture one or more image(s) 308. As described above, in some circumstances HDR selector 19 may select HDR image capture techniques where only a single image is captured by image sensor 12 or may select HDR image capture techniques where multiple image(s) 308 are captured by image sensor 12. If image(s) 308 includes multiple images, the multiple images may then be processed by fusion control unit 310. In general, fusion control unit 310 may apply processing techniques that fuse and/or blend the multiple images into a single image. The fused image is then passed to tone mapping unit 312. If image(s) 308 include only a single image, then image 308 may be passed directly to tone mapping unit 312. Tone mapping 312 may apply a tone mapping process to the received image. In generally, a tone mapping process maps one set of colors (e.g., from the input image) to another set of colors to approximate and/or improve the appearance a HDR images for mediums that may have more limited dynamic ranges (e.g., displays). Tone mapping unit 312 may then send output image 314 (e.g., an HDR image) for storage and/or display.

Figure 4:
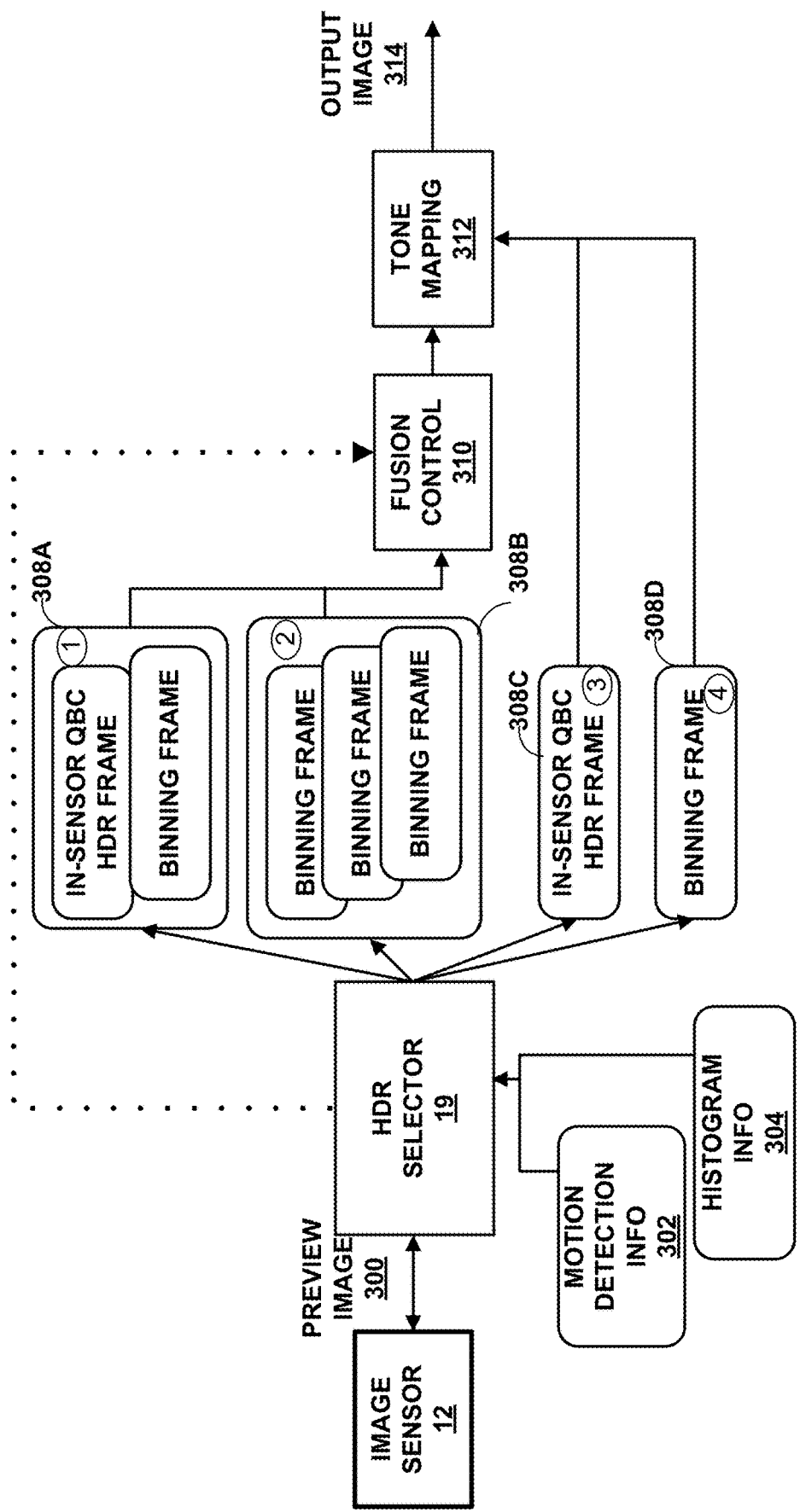
FIG. 4 is a block diagram illustrating example components of the computing device of FIG. 3 in greater detail.

FIG. 4 is a block diagram illustrating example components of the computing device of FIG. 3 in greater detail. FIG. 4 illustrates an example where HDR selector 19 is configured to select one of four image capture techniques based on histogram info 304, and motion detection info 302. As described above, HDR selector 19 may be configured to select one of the four image capture techniques that achieves a high SNR, wide dynamic range, and minimal to no ghosting for a variety of conditions.

HDR selector 19 may be configured to select an in-sensor QBC HDR image capture technique plus a long exposure binning frame (images 308A) for situations where histogram info 304 indicates that the scene of preview image 300 is an HDR scene, and where motion detection info 302 indicates that motion is present, but is not present in a dark area of preview image 300. Images 308A may then be passed to fusion control 310 for blending as there are multiple images for this image capture technique.

As will be described below with reference to FIGS. 8-9, HDR selector 19 may further determine a blending weight based on brightness (e.g., luminance value) in the in-sensor QBC HDR frame. The combination of an in-sensor QBC HDR frame plus a long exposure binning frame results in an output image 314 that has a wide dynamic range (e.g., from the QBC HDR frame), a high SNR (e.g., from fusing the long exposure binning frame in dark areas of the QBC HDR frame), and has little to no ghosting. The fusion of images 308 results in little ghosting because the long exposure binning frame is blended more heavily in dark areas of the frame, where no motion was detected.

HDR selector 19 may be configured to select an MFHDR image capture technique (e.g., images 308B) for situations where histogram info 304 indicates that the scene of preview image 300 is an HDR scene, and where motion detection info 302 indicates that motion is not present preview image 300. Images 308B may include three binning frames captured at different times with different length exposures. Images 308B may then be passed to fusion control 310 for blending as there are multiple images for this image capture technique. In general, MFHDR may produce an output image 314 with a wide dynamic range and a high SNR. While MFHDR is subject to ghosting, no ghosting would be expected in output image 314 since no motion was detected in preview image 300.

HDR selector 19 may be configured to select an in-sensor QBC HDR image capture technique (image 308C) for situations where histogram info 304 indicates that the scene of preview image 300 is an HDR scene, and where motion detection info 302 indicates that motion is present, and that motion present in a dark area of preview image 300. Image 308C may then be passed directly to tone mapping unit 312 as there are not multiple images for this image capture technique. The in-sensor QBC HDR capture technique generally has a lower SNR than MFHDR or QBC HDR plus a long exposure binning frame, but a single-frame in-sensor QBC HDR frame has minimal to no ghosting for all conditions and produces an output image 314 with a wide dynamic range. Because motion is in a dark area for the selection for the selection of the in-sensor QBC HDR capture technique, any attempt to improve the dark areas of san QBC HDR frame may introduce unwanted ghosting.

HDR selector 19 may be configured to select a single binning frame (e.g., a binning frame for ADRC) image capture technique (image 308D) for situations where histogram info 304 indicates that the scene of preview image 300 is not an HDR scene. Image 308D may then be passed directly to tone mapping unit 312 as there are not multiple images for this image capture technique. A single binning frame for ADRC generally has a high SNR, is ghosting free for all conditions, but exhibits a narrower dynamic range in output image 314 compared to the other three techniques. However, since histogram info 304 indicated that the scene was not an HDR scene, capturing the image with a narrower dynamic range is not likely to be noticeable to a user.

Figure 5:
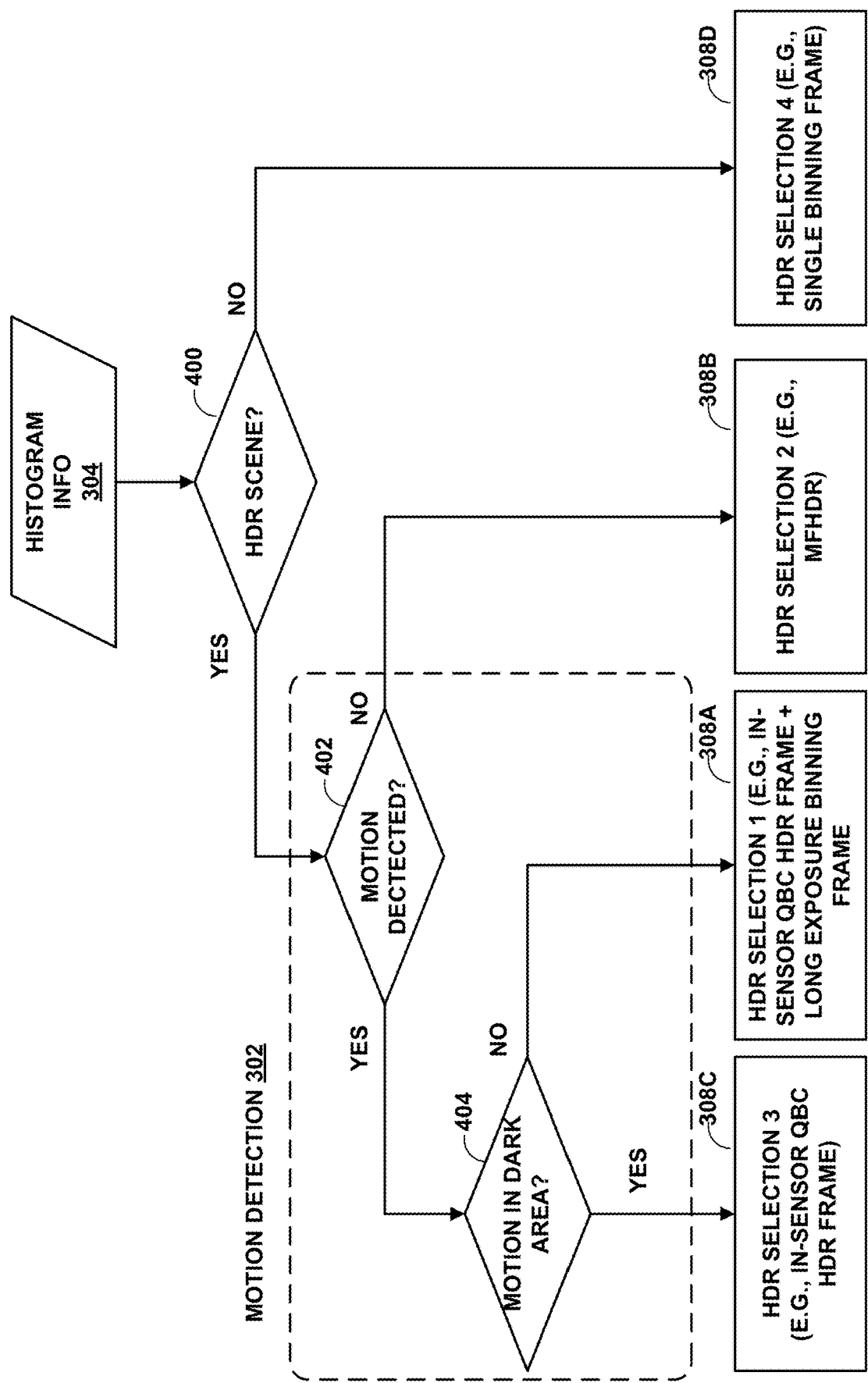
FIG. 5 is a flowchart showing an example method of the disclosure.

FIG. 5 is a flowchart showing an example method of the disclosure. HDR selector 19 may first access histogram info 304 and determine if the scene of a preview image is an HDR scene (400). If the scene is not an HDR scene (no at 400), HDR selector 19 selects HDR selection 4 (e.g., a single binning frame for ADRC) producing image 308D. In general, HDR selection 4 is a high SNR, narrow dynamic range, image capture technique.

If the scene is an HDR scene (yes at 400), HDR selector may then proceed to check motion detection info 302. First, HDR selector 19 may determine if there is any motion detected in the preview image (402). If there is no motion detected in the preview image (no at 402), HDR selector 19 selects HDR selection 2 (e.g., MFHDR) to produce images 308B. In general, HDR selection 2 is a multi-frame HDR image capture technique.

If there is motion detected in the preview image (yes at 402), HDR selector 19 then determines if there is motion in the dark area of the preview image (404) If there is no motion in the dark area (no at 404), HDR selector 19 selects HDR selection 1 (e.g., in-sensor QBC HDR+long exposure binning frame) to produce images 308. If there is motion in the dark area (yes at 404), HDR selector 19 selects HDR selection 3 (e.g., in-sensor QBC HDR frame) to produce image 308C.

Figure 6:
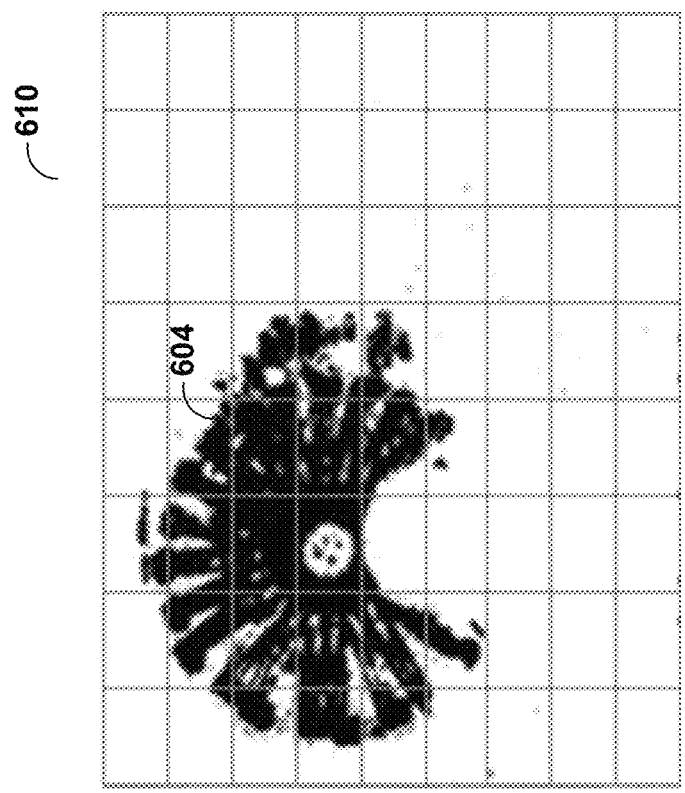
FIG. 6 is a conceptual diagram showing an example motion map.
Figure 6:
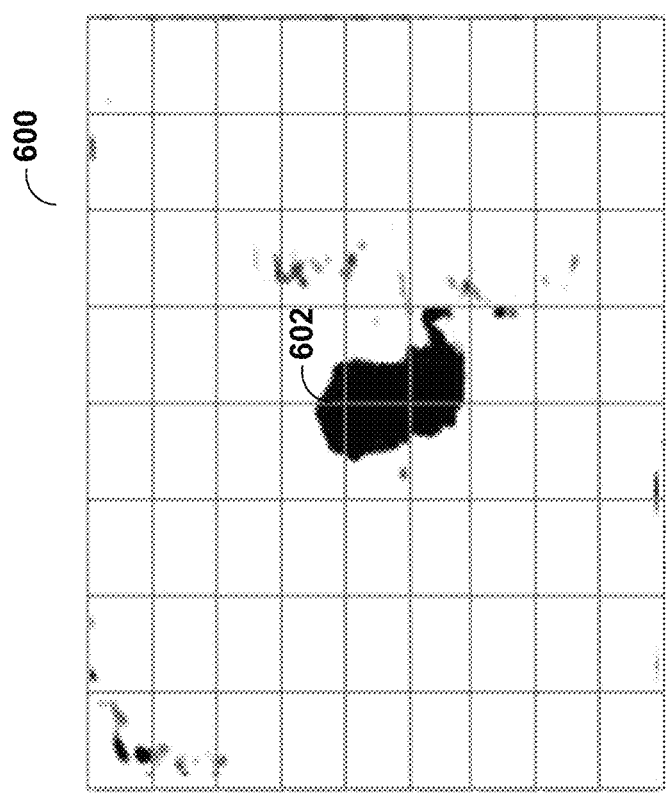

FIG. 6 is a conceptual diagram showing an example motion map. FIG. 6 shows a motion map 600 and a motion map 610. Motion maps 600 and 610 are examples of motion detection info 302. As shown in motion map 600, the black marked areas 602 indicate areas of motion. Likewise, in motion map 610, the black marked areas 604 indicate areas of motion. HDR selector 19 may use the motion maps to determine whether the scenes in the preview image have moving objects or not.

HDR selector 19 or another processing unit of computing device 10 may calculate motion in the preview image using any technique. As one example, HDR selector 19 may determine a sum of absolute differences (SAD) between pixels of a current preview image as compared to the pixels of a previously captured preview image. If the SAD of a pixel location of the current frame and the previous frame is greater than some threshold, motion is detected for that pixel. Otherwise, no motion is detected.

If SAD (Current Frame−previous frame)>threshold
   motion detected
else
   No motion detected
In one example, the threshold is between 9 and 15.

HDR selector 19 may be further configured to determine whether any motion is in a dark area or bright area according to grid stats. As shown in FIG. 6, motion maps 600 and 610 may be divided into a grid, where each grid represents an M×N region of pixels. If the brightness of a grid (e.g., the average brightness of the pixels in the grid) in which motion is detected is greater than a predetermined threshold, HDR selector 19 may determine that there is motion in a bright area of the preview image. If not, HDR selector 19 determines that the motion is in a dark area of the preview image.
If the brightness(grid stats of motion object)>threshold
   motion in the bright area
else
   motion in the dark area
In one example, the threshold is approximately 100 in the linear domain (e.g., before gamma correction).

Figure 7:
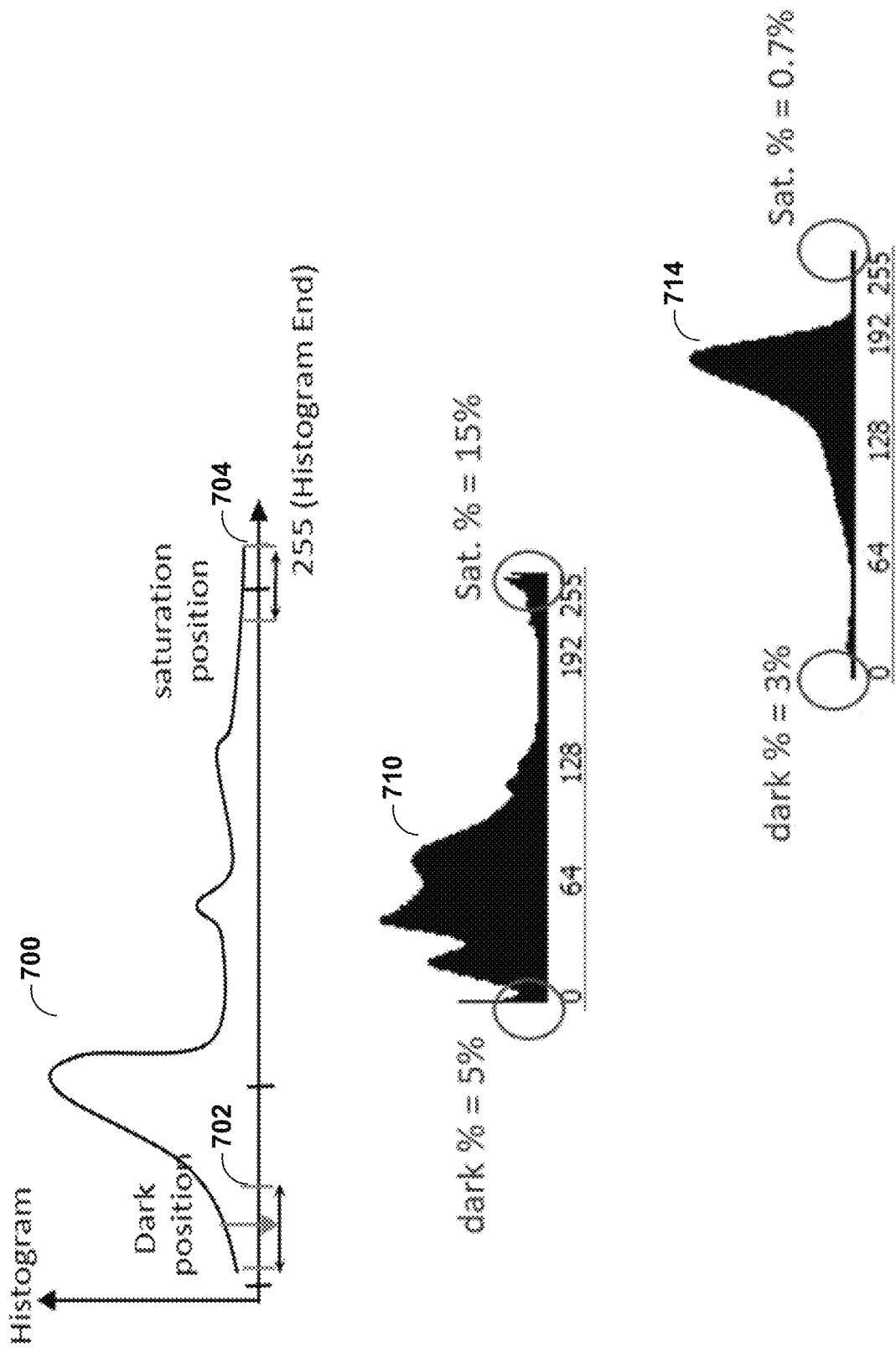
FIG. 7 is a conceptual diagram showing example brightness histograms.

FIG. 7 is a conceptual diagram showing example brightness histograms. FIG. 7 shows example histograms 700, 710, and 714 that may be generated by HDR selector 19 and/or other processing circuitry of computing device 10 and included in histogram info 304. As shown in histogram 700, the histogram includes information that indicates the number of pixels in the preview image that have each of the possible brightness values that may be detected by image sensor 12. In this example, the digital values of the brightness values (e.g., luminance values) may range from 0 to 255. Computing device 10 may further define a dark region 702 and saturation region 704 (e.g., a bright region) for each histogram. In the example of histogram 700, the dark region is from values 0 to 15 (e.g., bins 0 to 15), while the saturated region is from values 250 to 255 (e.g., bins 250 to 255). Of course, other sizes of dark and saturation regions may be used.

HDR selector 19 may use the histogram distribution info to determine whether the preview image is an HDR scene or not. HDR selector 19 or another processing unit of computing device 10 may calculate the saturation area percentage by dividing the number saturated pixels (i.e., the bright pixels) by the total number of pixels (e.g., all saturated pixels/all pixels). HDR selector 19 may further calculate the dark area percentage by dividing the number dark pixels by the total number of pixels (e.g., all dark pixels/all pixels). If the saturation area percentage added to the dark area percentage is greater than a predetermined threshold, HDR selector 19 may determine that the scene of the preview image is an HDR scene. If not, HDR selector 19 may determine that the scene of the preview image is not an HDR scene. In one example, the saturation area (e.g., the bright pixels) is defined as the highest 95%-100% of the available brightness values in the histogram. The dark area is defined as the lowest 0-25% of the available brightness values in the histogram. Of course, the definitions of the saturation and dark areas may be adjusted for other applications.

Histogram 710 shows an example of a histogram of an HDR scene, where the dark region percentage is 5% and the saturation region percentage is 15%. Histogram 714 shows an example of a histogram of a non-HDR scene, where the dark region percentage is 3% and the saturation region percentage is 0.7%.

Figure 8:
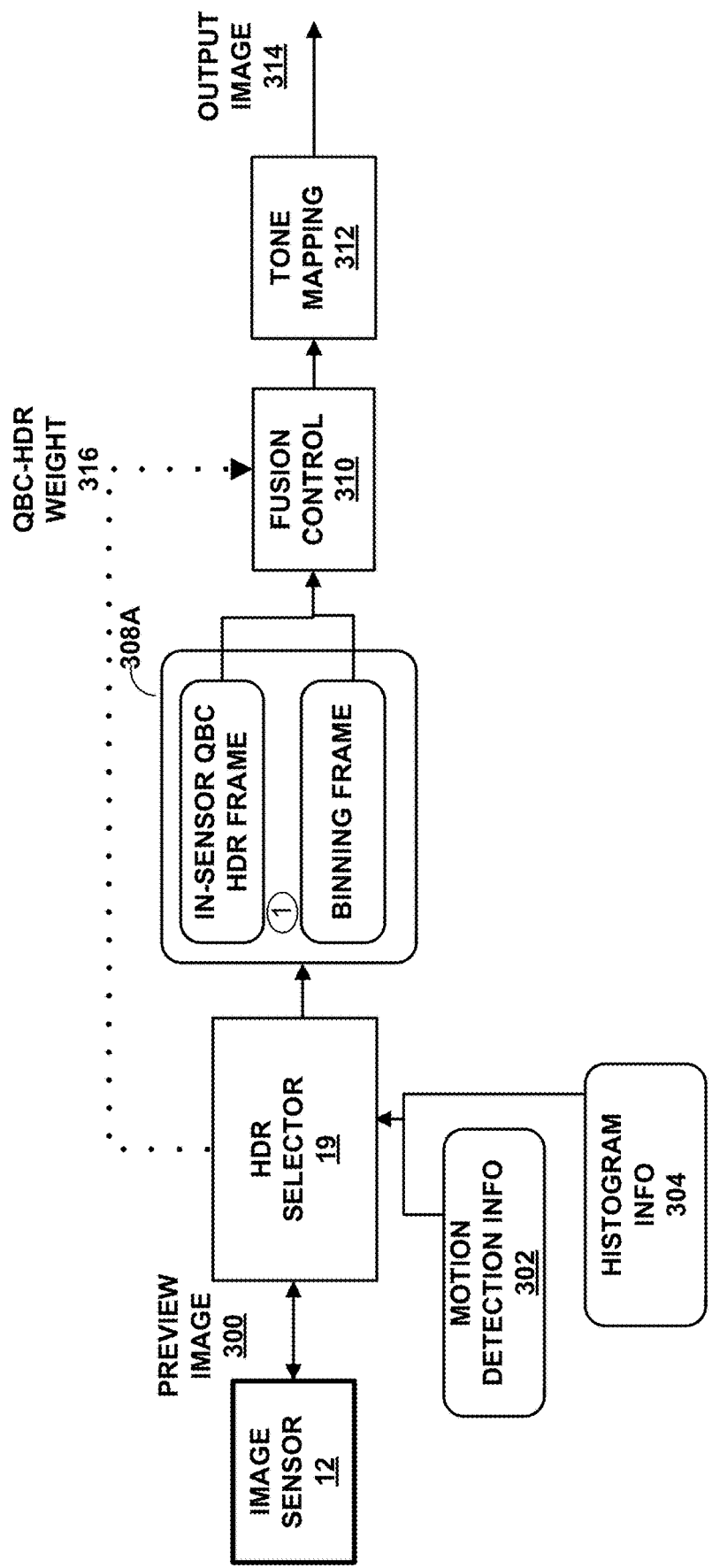
FIG. 8 is a block diagram illustrating example components of the computing device of FIG. 1 in greater detail for an HDR and binning frame image capture technique.
Figure 9:
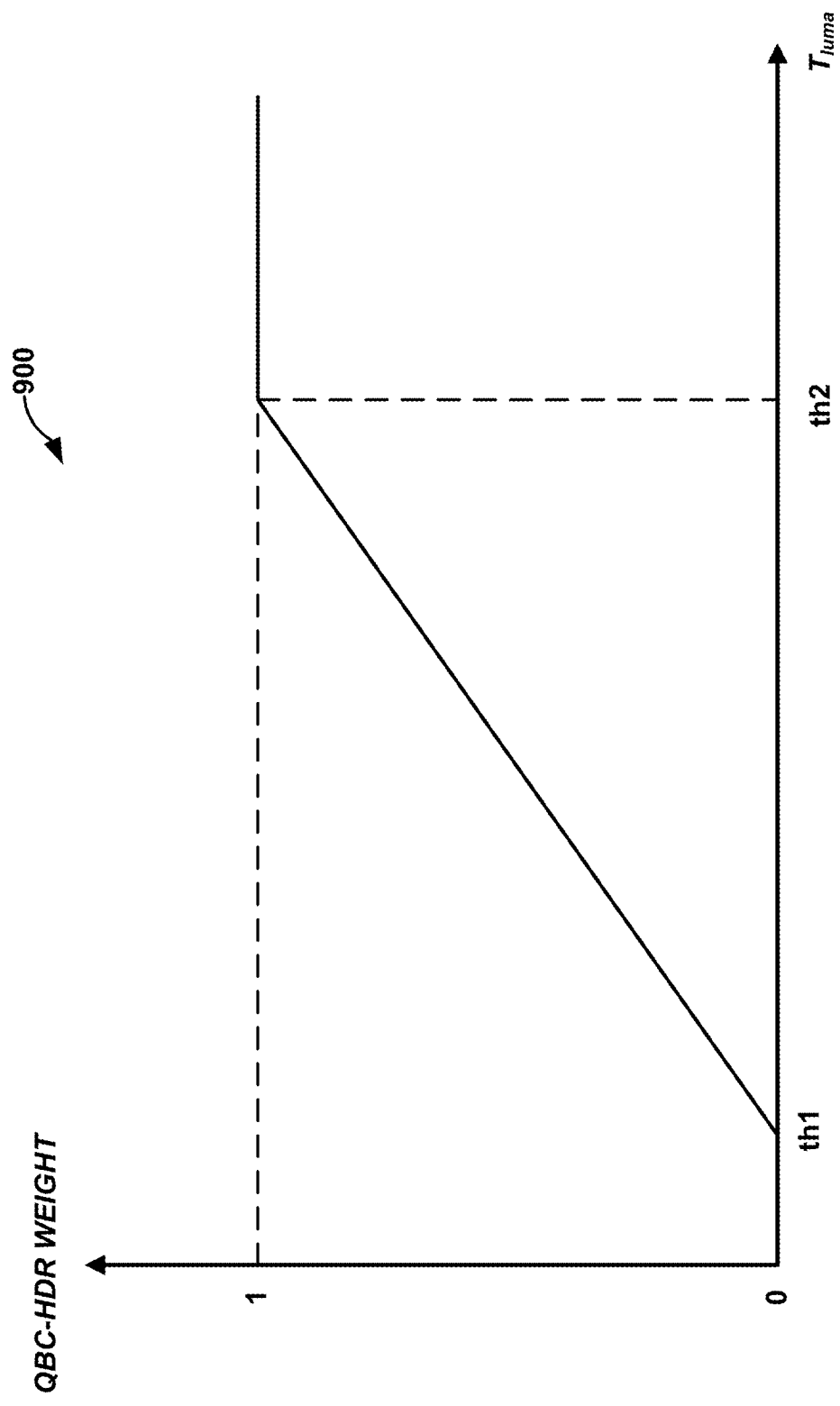
FIG. 9 is a conceptual diagram showing an example fusion weight used with the techniques of FIG. 8.

FIG. 8 is a block diagram illustrating example components of the computing device of FIG. 3 in greater detail for an HDR and binning frame image capture technique. In particular, FIG. 8 shows the example where HDR selector 19 selects HDR selection 1 (e.g., In-sensor QBC HDR frame+long exposure binning frame) for generated output image 314. In this example, fusion control unit 310 may be configured to fuse the QBC HDR frame with the long exposure binning frame according to QBC-HDR weight 316.

HDR selector 19 or another processing unit of computing device 10 may be configured to determine QBC-HDR weight 316 for each pixel in output image 314. For example, HDR selector 19 may be configured to determine QBC-HDR weight 316 as a function of pixel intensity in the preview image (e.g., brightness or luminance).

In one example, HDR selector 19 may calculate QBC-HDR weight 316 as follows:

$$QBC\text{-}HDR\ \text{weight} = \text{MIN}\left(1, \text{MAX}\left(0, \frac{T_{luma} - th1}{th2 - th1}\right)\right),$$

where MIN is a minimum function, MAX is a maximum function, $T_{luma}$ is a pixel intensity, th1 is a first threshold and th2 is a second threshold th2. FIG. 9 is a conceptual diagram showing an example plot 900 of a QBC-HDR fusion weight used with the techniques of FIG. 8. As can be seen in FIG.

9, QBC-HDR weight 316 has a value of 0 from pixel intensity values of 0 to the first threshold (th1). From the first threshold (th1) to the second threshold (th2) of pixel intensity values, QBC-HDR weight 316 increases linearly from 0 to 1. For pixel intensity values greater than the second threshold (th2), QBC-HDR weight is 1. The values of th1 and th2 may be tunable.

In general, fusion control 310 may be configured to apply a higher weight to the QBC HDR frame and a lower weight to the long exposure binning frame for brighter pixels. Fusion control unit 310 may create a fused image using the following equation:

$$QBC\text{-}HDR\ weight(pixel\ intensity)*QBC\ HDR\ frame+(1-QBC\text{-}HDR\ weight(pixel\ intensity))*binning\ frame$$

In the equation above, the term QBC-HDR (pixel intensity) indicates that the QBC-HDR weight at any particular pixel is a function of the intensity (e.g., brightness) of that pixel. As can be seen from plot 900, the higher the pixel intensity (e.g., the higher the brightness), the higher value for the QBC-HDR weight. As such, for HDR selection 1, fusion control unit 310 will more use pixels from long exposure binning frame for very dark pixel intensities (e.g., below th1), will use pixels from in-sensor QBC HDR frame for very bright pixel intensities (e.g., above th2), and will blend pixels from the long exposure binning frame and QBC HDR frame for pixel intensities between th1 and th2. In this way, SNR is improved in dark areas of output image 314, while maintaining ghosting free in bright areas.

Figure 10:
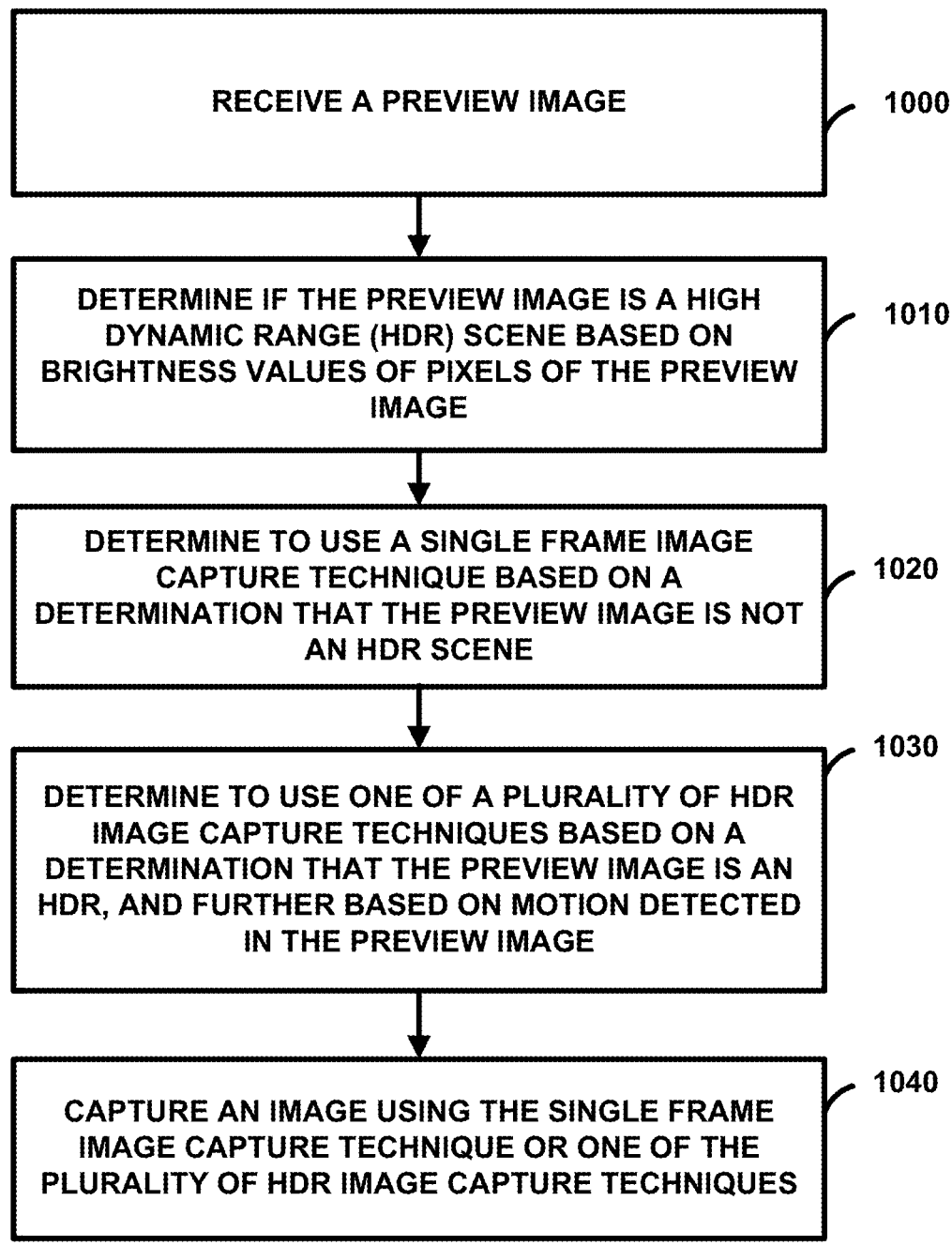
FIG. 10 is a flowchart illustrating an example operation of camera processing in accordance with example techniques of this disclosure.

FIG. 10 is a flowchart illustrating an example operation of camera processing in accordance with example techniques of this disclosure. The techniques of FIG. 10 may be performed by one or more structural units of computing device 10, including camera processor(s) 14 and CPU 16.

In one example of the disclosure, camera processor(s) 14 and/or CPU 16 may be configured to receive a preview image (1000). For example, camera processor(s) 14 and/or CPU 16 may be configured to cause a camera of cameras 15 to capture an image. Camera processor(s) 14 and/or CPU 16 may be further configured to determine if the preview image is a high dynamic range (HDR) scene based on brightness values of pixels of the preview image (1010). Camera processor(s) 14 and/or CPU 16 may be configured to determine to use a single frame image capture technique based on a determination that the preview image is not an HDR scene (1020).

For example, camera processor(s) 14 and/or CPU 16 may be configured to determine a histogram of the brightness values of the pixels of the preview image. To determine if the preview image is the HDR scene based on the brightness values of the pixels of the preview image, camera processor(s) 14 and/or CPU 16 may be configured to determine if the preview image is the HDR scene based on whether a percentage of brightness values in an oversaturated region of the histogram and an undersaturated region of the histogram is greater than a threshold (e.g., as described above). In one example, the single frame image capture technique is a single binning frame capture technique for adaptive dynamic range coding (ADRC).

Camera processor(s) 14 and/or CPU 16 may be further configured to determine to use one of a plurality of HDR image capture techniques based on a determination that the preview image is an HDR scene, and further based on motion detected in the preview image (1030). In one example, to determine to use one of the plurality of HDR image capture techniques based on the determination that the preview image is an HDR scene, and further based on motion detected in the preview image, camera processor(s) 14 and/or CPU 16 may be configured to detect if motion is present in the preview image, and determine to use a first HDR image capture technique based on detecting that no motion is present in the preview image, wherein the first HDR image capture technique includes capturing a plurality of images. In one example, the first HDR image capture technique is one of a multi-frame HDR (MFHDR) image capture technique or a staggered multi-frame HDR image capture technique.

In another example, to determine to use one of the plurality of HDR image capture techniques based on the determination that the preview image is an HDR scene, and further based on motion detected in the preview image, camera processor(s) 14 and/or CPU 16 may be configured to detect if motion is present in the preview image, determine, based on detecting that motion is present in the preview image, if the motion is in a dark area of the preview image, determine to use a single-frame HDR image capture technique based on determining that the motion is in the dark area of the preview image, and determine to use the single-frame HDR image capture technique together with a single frame image capture technique based on determining that the motion is not in the dark area of the preview image. In one example, the single-frame HDR image capture technique is an in-sensor Quad-Bayer coding (QBC) HDR image capture technique and wherein the single frame image capture technique is a long exposure binning frame image capture technique.

When using the single-frame HDR image capture technique together with a single frame image capture technique, camera processor(s) 14 and/or CPU 16 may be configured to capture a first image using the in-sensor QBC HDR image capture technique, capture a second image using the long exposure binning frame image capture technique, and fuse the first image and the second image into the output image based on a blending weight. In this example, camera processor(s) 14 and/or CPU 16 may be further configured to determine the blending weight as a function of a pixel brightness values.

In the above examples, camera processor(s) 14 and/or CPU 16 may be configured to detect if motion is present in the preview image based on a function of a sum of absolute differences of pixels values between the preview image and a previously captured image. Camera processor(s) 14 and/or CPU 16 may be configured to generate an output image using one or more images captured using the single frame image capture technique or one of the plurality of HDR image capture techniques (1140). For example, camera processor(s) 14 and/or CPU 16 may be configured to cause one or more of cameras 15 to capture one or more images using the single frame image capture technique or one of the plurality of HDR image capture techniques.

Other illustrative examples of the disclosure are described below in the following clauses.

Clause 1—A device configured for camera processing, the device comprising: a memory configured to receive images; and one or more processors in communication with the memory, the one or more processors configured to: receive a preview image; determine if the preview image is a high dynamic range (HDR) scene based on brightness values of pixels of the preview image; determine to use a single frame image capture technique based on a determination that the preview image is not an HDR scene; determine to use one of a plurality of HDR image capture techniques based on a determination that the preview image is an HDR scene, and further based on motion detected in the preview image; and generate an output image using one or more images captured using the single frame image capture technique or one of the plurality of HDR image capture techniques.

Clause 2—The device of Clause 1, wherein to determine to use one of the plurality of HDR image capture techniques based on the determination that the preview image is an HDR scene, and further based on motion detected in the preview image, the one or more processors are further configured to: detect if motion is present in the preview image; and determine to use a first HDR image capture technique based on detecting that no motion is present in the preview image, wherein the first HDR image capture technique includes capturing a plurality of images.

Clause 3—The device of Clause 2, wherein the first HDR image capture technique is one of a multi-frame HDR (MFHDR) image capture technique or a staggered multi-frame HDR image capture technique.

Clause 4—The device of any combination of Clauses 1-3, wherein to determine to use one of the plurality of HDR image capture techniques based on the determination that the preview image is an HDR scene, and further based on motion detected in the preview image, the one or more processors are further configured to: detect if motion is present in the preview image; determine, based on detecting that motion is present in the preview image, if the motion is in a dark area of the preview image; determine to use a single-frame HDR image capture technique based on determining that the motion is in the dark area of the preview image; and determine to use the single-frame HDR image capture technique together with a single frame image capture technique based on determining that the motion is not in the dark area of the preview image.

Clause 5—The device of Clause 4, wherein the single-frame HDR image capture technique is an in-sensor Quad-Bayer coding (QBC) HDR image capture technique and wherein the single frame image capture technique is a long exposure binning frame image capture technique.

Clause 6—The device of Clause 5, wherein the one or more processors determine to use the single-frame HDR image capture technique together with a single frame image capture technique, the one or more processors further configured to: capture a first image using the in-sensor QBC HDR image capture technique; capture a second image using the long exposure binning frame image capture technique; and fuse the first image and the second image into the output image based on a blending weight.

Clause 7—The device of Clause 6, wherein the one or more processors are further configured to: determine the blending weight as a function of a pixel brightness value.

Clause 8—The device of any combination of Clauses 1-7, wherein the one or more processors are further configured to: detect if motion is present in the preview image based on a function of a sum of absolute differences of pixels values between the preview image and a previously captured image.

Clause 9—The device of any combination of Clauses 1-8, wherein the one or more processors are further configured to: determine a histogram of the brightness values of the pixels of the preview image.

Clause 10—The device of Clause 9, wherein to determine if the preview image is the HDR scene based on the brightness values of the pixels of the preview image, the one or more processors are configured to: determine if the preview image is the HDR scene based on whether a percentage of brightness values in an oversaturated region of the histogram and an undersaturated region of the histogram is greater than a threshold.

Clause 11—The device of Clause 10, wherein the single frame image capture technique is a single binning frame capture technique for adaptive dynamic range coding (ADRC).

Clause 12—The device of any combination of Clauses 1-11, further comprising: one or more cameras configured to capture one or more images using the single frame image capture technique or one of the plurality of HDR image capture techniques.

Clause 13—A method of camera processing, the method comprising: receiving a preview image; determining if the preview image is a high dynamic range (HDR) scene based on brightness values of pixels of the preview image; determining to use a single frame image capture technique based on a determination that the preview image is not an HDR scene; determining to use one of a plurality of HDR image capture techniques based on a determination that the preview image is an HDR scene, and further based on motion detected in the preview image; and generating an output image using one or more images captured using the single frame image capture technique or one of the plurality of HDR image capture techniques.

Clause 14—The method of Clause 13, wherein determining to use one of the plurality of HDR image capture techniques based on the determination that the preview image is an HDR scene, and further based on motion detected in the preview image, comprises: detecting if motion is present in the preview image; and determining to use a first HDR image capture technique based on detecting that no motion is present in the preview image, wherein the first HDR image capture technique includes capturing a plurality of images.

Clause 15—The method of Clause 14, wherein the first HDR image capture technique is one of a multi-frame HDR (MFHDR) image capture technique or a staggered multi-frame HDR image capture technique.

Clause 16—The method of any combination of Clauses 13-15, wherein determining to use one of the plurality of HDR image capture techniques based on the determination that the preview image is an HDR scene, and further based on motion detected in the preview image, comprises: detecting if motion is present in the preview image; determining, based on detecting that motion is present in the preview image, if the motion is in a dark area of the preview image; determining to use a single-frame HDR image capture technique based on determining that the motion is in the dark area of the preview image; and determining to use the single-frame HDR image capture technique together with a single frame image capture technique based on determining that the motion is not in the dark area of the preview image.

Clause 17—The method of Clause 16, wherein the single-frame HDR image capture technique is an in-sensor Quad-Bayer coding (QBC) HDR image capture technique and wherein the single frame image capture technique is a long exposure binning frame image capture technique.

Clause 18—The method of Clause 17, further comprising: determining to use the single-frame HDR image capture technique together with a single frame image capture technique; capturing a first image using the in-sensor QBC HDR image capture technique; capturing a second image using the long exposure binning frame image capture technique; and fusing the first image and the second image into the output image based on a blending weight.

Clause 19—The method of Clause 18, further comprising: determining the blending weight as a function of a pixel brightness value.

Clause 20—The method of any combination of Clauses 13-19, further comprising: detecting if motion is present in the preview image based on a function of a sum of absolute differences of pixels values between the preview image and a previously captured image.

Clause 21—The method of any combination of Clauses 13-20, further comprising: determining a histogram of the brightness values of the pixels of the preview image.

Clause 22—The method of Clause 21, wherein determining if the preview image is the HDR scene based on the brightness values of the pixels of the preview image comprises: determining if the preview image is the HDR scene based on whether a percentage of brightness values in an oversaturated region of the histogram and an undersaturated region of the histogram is greater than a threshold.

Clause 23—The method of Clause 22, wherein the single frame image capture technique is a single binning frame capture technique for adaptive dynamic range coding (ADRC).

Clause 24—The method of any combination of Clauses 13-23, further comprising: capturing one or more images using the single frame image capture technique or one of the plurality of HDR image capture techniques.

Clause 25—A non-transitory computer-readable storage medium storing instructions that, when executed, cause one or more processors of a device to perform any combination of techniques of clauses 13-24.

Clause 26—A device for camera processing, the device comprising means for performing any combination of techniques of clauses 13-24.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where discs usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Various examples have been described. These and other examples are within the scope of the following claims.

What is claimed is:

1. A device configured for camera processing, the device comprising:
   a memory configured to receive images; and
   one or more processors in communication with the memory, the one or more processors configured to:
      receive a first image;
      compare brightness values of the pixels in the first image to a first threshold to determine the dark area of the first image, wherein the dark area includes less than all of the pixels of the first image;
      detect if motion is not present in the dark area of the first image;
      determine to use one of a plurality of high dynamic range (HDR) image capture techniques based on if the motion is not detected in the dark area of the first image; and
      generate an output image using one or more images captured using one of the plurality of HDR image capture techniques.

2. The device of claim 1, wherein the one or more processors are further configured to:
   determine that the first image is an HDR scene based on the brightness values of pixels of the first image; and
   determine to use one of the plurality of HDR image capture techniques based on the determination that the first image is the HDR scene, and further based on if the motion is not detected in the dark area of the first image, and wherein the one or more processors are further configured to:
   determine to use a first HDR image capture technique based on detecting that no motion is present in the first image, wherein the first HDR image capture technique includes capturing a plurality of images.

3. The device of claim 2, wherein the first HDR image capture technique is one of a multi-frame HDR (MFHDR) image capture technique or a staggered multi-frame HDR image capture technique.

4. The device of claim 1, wherein to determine to use one of the plurality of HDR image capture techniques based on if the motion is not detected in the dark area of the first image, the one or more processors are further configured to:
   determine to use a single-frame HDR image capture technique based on determining that the motion is in the dark area of the first image; and
   determine to use the single-frame HDR image capture technique together with a single frame image capture technique based on determining that the motion is not in the dark area of the first image.

5. The device of claim 4, wherein the single-frame HDR image capture technique is an in-sensor Quad-Bayer coding (QBC) HDR image capture technique and wherein the single frame image capture technique is a long exposure binning frame image capture technique.

6. The device of claim 5, wherein the one or more processors determine to use the single-frame HDR image capture technique together with a single frame image capture technique, the one or more processors further configured to:
capture a second image using the in-sensor QBC HDR image capture technique;
capture a third image using the long exposure binning frame image capture technique; and
fuse the second image and the third image into the output image based on a blending weight.

7. The device of claim 6, wherein the one or more processors are further configured to:
determine the blending weight as a function of a pixel brightness value.

8. The device of claim 1, wherein the one or more processors are further configured to:
detect if motion is present in the first image based on a function of a sum of absolute differences of pixel values between the first image and a previously captured image.

9. The device of claim 1, wherein the one or more processors are further configured to:
determine a histogram of the brightness values of the pixels of the first image.

10. The device of claim 9, wherein the one or more processors are configured to:
determine that the first image is an HDR scene based on a percentage of brightness values in an oversaturated region of the histogram and an undersaturated region of the histogram being greater than a second threshold.

11. The device of claim 1, further comprising:
one or more cameras configured to capture one or more images using one of the plurality of HDR image capture techniques.

12. A method of camera processing, the method comprising:
receiving a first image;
comparing brightness values of the pixels in the first image to a first threshold to determine the dark area of the first image, wherein the dark area includes less than all of the pixels of the first image;
detecting if motion is not present in the dark area of the first image;
determining to use one of a plurality of high dynamic range (HDR) image capture techniques based on if the motion is not detected in the dark area of the first image; and
generating an output image using one or more images captured one of the plurality of HDR image capture techniques.

13. The method of claim 12, further comprising:
determining that the first image is an HDR scene based on the brightness values of pixels of the first image, wherein determining to use one of the plurality of HDR image capture techniques comprises determining to use one of the plurality of HDR image capture techniques based on the determination that the first image is the HDR scene, and further based on if the motion is not detected in the dark area of the first image, the method further comprising:
determining to use a first HDR image capture technique based on detecting that no motion is present in the first image, wherein the first HDR image capture technique includes capturing a plurality of images.

14. The method of claim 13, wherein the first HDR image capture technique is one of a multi-frame HDR (MFHDR) image capture technique or a staggered multi-frame HDR image capture technique.

15. The method of claim 12, wherein determining to use one of the plurality of HDR image capture techniques based on if the motion is not detected in the dark area of the first image comprises:
determining to use a single-frame HDR image capture technique based on determining that the motion is in the dark area of the first image; and
determining to use the single-frame HDR image capture technique together with a single frame image capture technique based on determining that the motion is not in the dark area of the first image.

16. The method of claim 15, wherein the single-frame HDR image capture technique is an in-sensor Quad-Bayer coding (QBC) HDR image capture technique and wherein the single frame image capture technique is a long exposure binning frame image capture technique.

17. The method of claim 16, further comprising:
determining to use the single-frame HDR image capture technique together with a single frame image capture technique;
capturing a second image using the in-sensor QBC HDR image capture technique;
capturing a third image using the long exposure binning frame image capture technique; and
fusing the second image and the third image into the output image based on a blending weight.

18. The method of claim 17, further comprising:
determining the blending weight as a function of a pixel brightness value.

19. The method of claim 12, further comprising:
detecting if motion is present in the first image based on a function of a sum of absolute differences of pixels values between the first image and a previously captured image.

20. The method of claim 12, further comprising:
determining a histogram of the brightness values of the pixels of the first image.

21. The method of claim 20, further comprising:
determining that the first image is an HDR scene based on a percentage of brightness values in an oversaturated region of the histogram and an undersaturated region of the histogram being greater than a second threshold.

22. The method of claim 12, further comprising:
capturing one or more images using one of the plurality of HDR image capture techniques.

23. A non-transitory computer-readable storage medium storing instructions that, when executed, cause one or more processors of a device to:
receive a first image;
compare brightness values of the pixels in the first image to a first threshold to determine the dark area of the first image, wherein the dark area includes less than all of the pixels of the first image;
detect if motion is not present in the dark area of the first image;

determine to use one of a plurality of high dynamic range (HDR) image capture techniques based on if the motion is not detected in the dark area of the first image; and generate an output image using one or more images captured using one of the plurality of HDR image capture techniques.

24. A device for camera processing, the device comprising:

means for receiving a first image;

means for comparing brightness values of the pixels in the first image to a first threshold to determine the dark area of the first image, wherein the dark area includes less than all of the pixels of the first image;

means for detecting if motion is not present in the dark area of the first image;

means for determining to use one of a plurality of high dynamic range (HDR) image capture techniques based on if the motion is not detected in the dark area of the first image; and means for generating an output image using one or more images captured using one of the plurality of HDR image capture techniques.

\* \* \* \* \*